United States Patent
Seiler et al.

(10) Patent No.: US 11,743,435 B2
(45) Date of Patent: Aug. 29, 2023

(54) MULTI-PROJECTOR DISPLAY ARCHITECTURE

(71) Applicant: Meta Platforms Technologies, LLC, Menlo Park, CA (US)

(72) Inventors: Larry Seiler, Redmond, WA (US); William Thomas Blank, Bellevue, WA (US); Warren Andrew Hunt, Woodinville, WA (US); Michael Yee, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 5 days.

(21) Appl. No.: 17/349,769

(22) Filed: Jun. 16, 2021

(65) Prior Publication Data

US 2022/0006987 A1   Jan. 6, 2022

Related U.S. Application Data

(63) Continuation of application No. 16/785,305, filed on Feb. 7, 2020, now Pat. No. 11,070,778.

(60) Provisional application No. 62/805,923, filed on Feb. 14, 2019.

(51) Int. Cl.
*H04N 9/31* (2006.01)
*G09G 3/32* (2016.01)
*G02B 27/01* (2006.01)

(52) U.S. Cl.
CPC ....... *H04N 9/3182* (2013.01); *G02B 27/0172* (2013.01); *G09G 3/32* (2013.01); *H04N 9/3185* (2013.01); *G02B 2027/0178* (2013.01)

(58) Field of Classification Search
CPC ...... H04N 9/3182; H04N 9/3185; G09G 3/32; G09G 3/2022; G09G 2330/10; G09G 3/2051; G09G 2380/14; G09G 3/003; G09G 2320/0233; G09G 5/14; G09G 5/363; G09G 3/001; G02B 27/0172; G02B 2027/0178; G02B 2027/0116; G02B 2027/011; G02B 2027/0118; G02B 2027/014; G02B 27/017
See application file for complete search history.

(56) References Cited

U.S. PATENT DOCUMENTS 9,829,710 B1 * 11/2017 Newell ............... G09G 3/3258
11,122,256 B1 * 9/2021 Topliss ............... G02B 27/0172
(Continued)

*Primary Examiner* — Sahlu Okebato
(74) *Attorney, Agent, or Firm* — Baker Botts L.L.P.

(57) ABSTRACT

In an embodiment, a headset display device includes a central processor and multiple projector integrated circuits for eyes of a wearer of the headset display device. Each eye of the wear is associated with at least three projector integrated circuits. Each of the three projector integrated circuits is communicatively coupled to the central processor. Each projector integrated circuit includes a first integrated circuit including a light emitter array having monochrome light emitters of a single color, and a second integrated circuit coupled to the first integrated circuit. The second integrated circuit includes a graphics processor configured to generate transformed image data. The graphics processor is configured to provide the transformed image data to the first integrated circuit. The first integrated circuit is configured to output the transformed image data using the light emitter array.

20 Claims, 16 Drawing Sheets

(56) References Cited

U.S. PATENT DOCUMENTS

| | | | |
|---|---|---|---|
| 2014/0085190 A1* | 3/2014 | Erinjippurath | G02B 27/0172 345/207 |
| 2015/0116199 A1* | 4/2015 | Yang | G02B 27/0172 345/156 |
| 2016/0131904 A1* | 5/2016 | Border | G06V 20/20 345/8 |

* cited by examiner

MULTI-PROJECTOR DISPLAY ARCHITECTURE

PRIORITY

This application is a continuation under 35 U.S.C. § 120 of U.S. patent application Ser. No. 16/785,305, filed 7 Feb. 2020, which claims the benefit, under 35 U.S.C. § 119(e), of U.S. Provisional Patent Application No. 62/805,923, filed 14 Feb. 2019, which is incorporated herein by reference.

TECHNICAL FIELD

This disclosure generally relates to displaying images on an electronic display.

BACKGROUND

Use of portable displays has increased dramatically, increasing demand for lightweight and power efficient displays. However, some such displays may sacrifice clarity, frame rate, or field of view to allow for reduced power requirements, and, in the case of body-carried displays, more comfortable wear. However, user experience often suffers because of these sacrifices. Displays may reduce brightness, or lower resolution, color depth, maximum display frame rate, or field of view, which reduces the appeal of using such a display. Displays with low frame rates and fields of view may not even be practical for certain applications. Particularly in scenarios where the display is used to provide an artificial reality experience to the user, display quality impacts the perception of the quality of the experience itself. Further complicating the issue is the high computing cost required to render and support high quality user experiences.

SUMMARY OF PARTICULAR EMBODIMENTS

In particular embodiments, a display of a head-mounted display system may operate by providing an image to a user through a waveguide configuration on the display. The image may be provided by one or more projector integrated circuits associated with the display. In particular embodiments, a plurality of projector integrated circuits may be used, with one or more projectors associated with each of the user's eyes. The projector integrated circuits may be coordinated by a central headset CPU that dispatches some rendering data and instructions to the projectors.

In particular embodiments, a projector integrated circuit (referenced herein also as simply a "projector") may comprise several components. The components may be, and may be embodied in, an integrated circuit. The components may include a warp engine, a display driver, and a backplane controller. A warp engine may perform initial visibility determinations for frame data stored as specialized object primitives received from a rendering engine, determine geometric warps to apply to the frame data, calculate a apply texture mapping and filtering, and otherwise prepare the frame data for display. A display driver may perform processing on images output from a warp engine. For example, a display driver may perform non-uniformity corrections and dithering as needed. A backplane controller may receive the image data and instruct a light source to display the image data.

In particular embodiments, the components of a projector may be combined in a variety of architectures chosen to optimize the performance and power efficiency of a display of a head-mounted display while still providing a high-quality image. For example, a warp engine may be incorporated with a headset central processor and associated with several display drivers and backplane controllers. A warp engine may be incorporated with one or more display drivers in a shared integrated circuit. A warp engine may be further incorporated with one or more backplane controllers, sharing an integrated circuit. The integrated circuits comprising a projector may be manufactured with a variety of processes, and, in particular embodiments, may be so-called "stacked" three-dimensional integrated circuits or "side-by-side" two-and-a-half dimensional integrated circuits.

In particular embodiments, the architecture chosen for a projector may inform the packaging choices for the integrated circuits and other components which comprise the projector. For example, an emitter array may be bonded to an integrated circuit which is mounted to a circuit board. The circuit board may be mounted, with other similar circuits, to a mechanical aligner which adjusts the position of the emitter array relative to a waveguide coupler. As another example, an emitter array may be bonded to an integrated circuit which shares a circuit board with several other similar integrated circuits. As another example, an emitter array may be bonded to an integrated circuit which is bonded to an interposer that is shared amongst several similar integrated circuits. The interposer may be bonded to a circuit board. As another example, an emitter array may be bonded to its own interposer which is bonded to an integrated circuit that has several similar interposer arrangements bonded to it. As another example, several emitter arrays may be bonded to an integrated circuit. The integrated circuits may embody one or more warp engines, display drivers, or backplane controllers.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Artificial Reality

Figure 1:
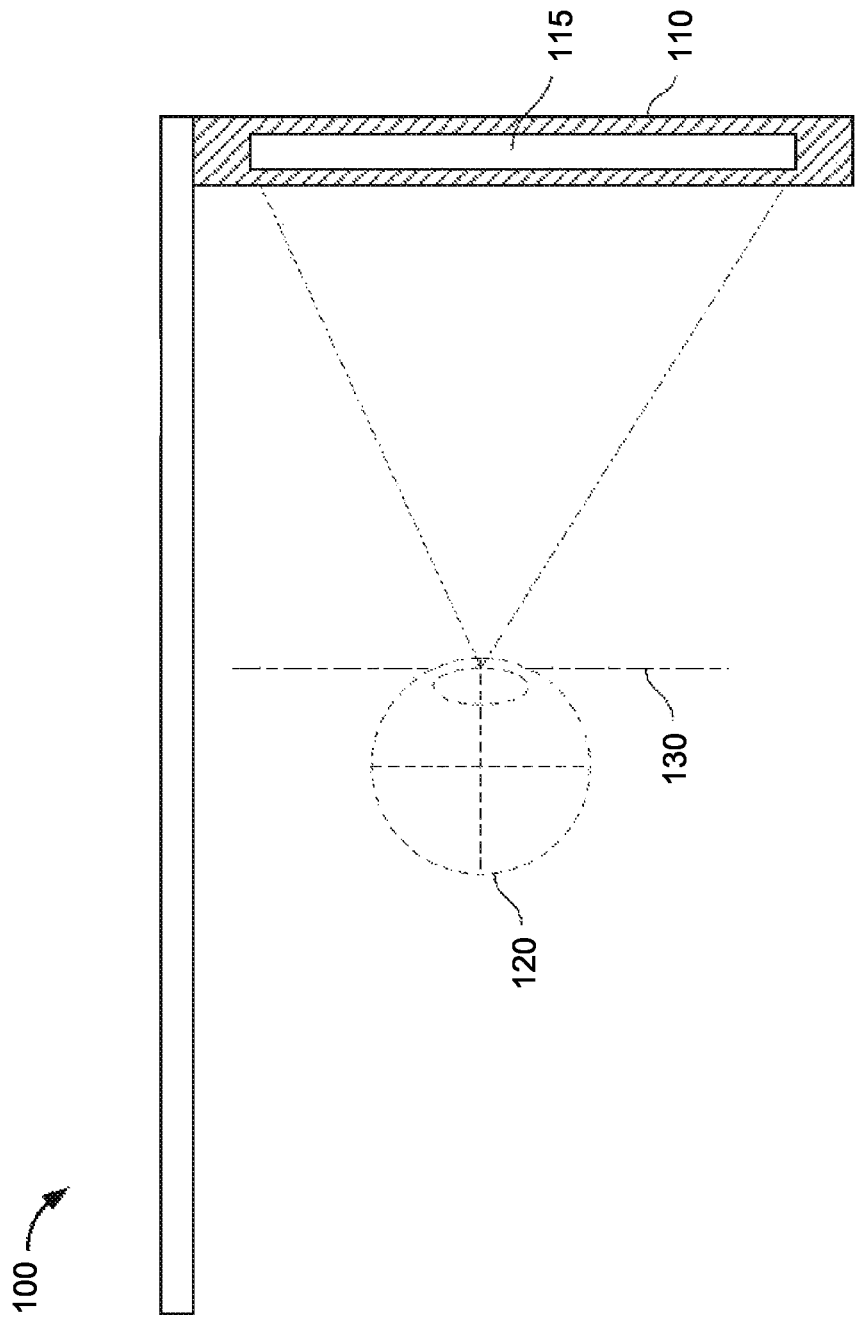
FIG. 1 illustrates a cross section of an example head-mounted display and display system.

As described above, artificial reality is a form of reality that has been adjusted in some manner before presentation to a user by specially-configured devices. Element of particular embodiments described herein may be used to improve the functionality, efficiency, and reliability of artificial reality devices. Artificial reality devices may create digital scenes or superpose computer-generated imagery onto a view of the real world. Artificial reality devices therefore provide a platform for designers and engineers to provide new forms of information, entertainment, or methods of collaboration. For example, artificial reality devices may allow users to communicate, seemingly in person, over long distances, or assist users by informing them of the environment around them in an unobtrusive manner. Because artificial reality experiences can often be customized, the user's experience with artificial reality may be deeply personal and highly engaging if presented with sufficient clarity and convenience.

One way that artificial reality experiences can augment human ability is with computer-generated images and/or text added to the real world, as in an augmented or mixed reality. From this simple principle, a variety of compelling use cases can be considered. Labels (e.g., text, glyphs, etc.) or images describing a real-world object may be fixed in the world space (e.g., location-aware labels acting as street signs or providing a live map of a bike path), or images fixed to a real-world object as it moves through the space (e.g., a label added to a bus as it going on its route that provides detailed information about its route or capacity). Labels could also be used to help a user navigate through an unfamiliar city (e.g., creating a waypoint for the nearest restroom), or help find a friend in a crowd (e.g., a socially-aware waypoint fixed to another user). Other experiences worth considering may be based on interactions with real-world objects. For example, a user could "project" video onto a wall or screen that allows for the video to be played and visible to only herself or to others with access to a shared augmented space. As another example, a user could fix computer-generated text to a physical object to act as an augmented-reality book or magazine. Content could be displayed relative to the object (allowing a user to physical asset aside an augmented-reality) or could be displayed in a fixed relation to the user's (e.g., a tutorial video constantly playing in a corner of the view). Presented media could be customized to the user, so that the same content display space could content relevant to each person viewing the same physical space. As another example, a user could interact with computer-generated graphics by "touching" an icon, or "manipulating" the computer-generated images manually. These graphics could be shown to multiple users working on a project, enabling opportunities for team collaboration (e.g., multiple architects working on a three-dimensional digital prototype in a building together in real-time).

Head-Mounted Displays

One convenient form factor for an artificial reality device is a head-mounted display (HMD). The display that outputs the computer-generated graphics should be intuitive, easily accessible, and unobtrusive. One approach to displaying high definition artificial reality graphics to a user is an HMD comprising a near-eye display (NED). The user wears an apparatus, such as a visor, headset, or glasses, capable of displaying computer graphics. In augmented or mixed reality experiences, the computer graphics can be seen alongside, or on top of, the physical world. However, rendering these computer graphics is computationally intensive. Therefore, in most cases rendering is performed by powerful computers communicatively attached (e.g., via a cable or wireless communication protocol, such as Bluetooth) to a HMD. In such a configuration, the HMD is limited by bulky cords, bandwidth and power limitations, heat restrictions, and other related constraints. Yet, the limits of these constraints are being pushed. HMDs that are comfortable and efficient enough for day-long wear, yet powerful enough to display sophisticated graphics are desirable.

FIG. 1 provides an illustration of an example HMD. In particular, FIG. 1 is a cross-section of a HMD 100 and display device 110, according to some embodiments. The display device 110 may include at least one waveguide configuration 115. FIG. 1 shows an eyebox 130, which is a location where the eye 120 is positioned when the user wears the display device 110. As long as the eye 120 is aligned with the eyebox 130, the user may be able to see a full-color image or a pupil replication directed toward the eyebox 130 by the waveguide configuration 115. The waveguide configuration 115 may produce and direct many pupil replications to the eyebox 130. For purposes of illustration, FIG. 1 shows the cross-section associated with a single eye 120 and single waveguide configuration 115. In some embodiments, another waveguide configuration may provide image light to an eyebox located at another eye 120 of the user.

The waveguide configuration 115, as illustrated in FIG. 1, may be configured to direct the image light to an eyebox located proximate to the eye 120. The waveguide configuration 115 may be composed of one or more materials (e.g., plastic, glass, etc.) with one or more refractive indices that effectively minimize the weight and widen a field of view (FOV) of the display device 110. In alternate configurations, the display device 110 may include one or more optical elements between the waveguide configuration 115 and the eye 120. The optical elements may act to, e.g., correct aberrations in image light emitted from the waveguide configuration 110, magnify image light emitted from the waveguide configuration 115, make some other optical adjustment of image light emitted from the waveguide configuration 115, or perform some combination thereof. Examples of optical elements may include an aperture, a Fresnel lens, a refractive (e.g., convex and/or concave) lens, a reflective surface, a filter, or any other suitable optical element that affects image light. The waveguide configuration 115 may, for example, include a waveguide with one or more sets of Bragg gratings.

One example form of display that may be used in a HMD may be referred to as a scanline or one-dimensional ("1D") waveguide display. In this display a row of a light sources may generate the light source that is used to illuminate the entire vertical space (or horizontal space, where appropriate) of the display. Multiple smaller images are combined to form a larger composite image as perceived by the viewer. A scanning element may cause the source light, treated by waveguide components, to be output to the eye of the user in a specific pattern corresponding to a generation pattern used by the emitters to optimize display draw rate. For example, the light source may first be provided color values corresponding to a single row of pixels along the top of a display image. The light may be transferred to the appropriate section of the eyebox using a waveguide-based process assisted with a microelectromechanical system (MEMS) powered oscillating mirror. After a short period of time, the light source may be provided color values corresponding to the next row of pixels (e.g., below the first). The light for this section of the image may then use the same process to position the color values in the appropriate position. Scanning displays may require less power to run, and may generate less heat, than traditional display comprised of the same emitters. They may have less weight as well, owing in part to the quality of the materials used in the scanning element and optics system. The frame rate of the display is limited based on the oscillation speed of the mirror.

Another example form of display that may be used in a HMD may be a 2D or two-dimensional waveguide display. In such a display, no oscillating mirror is required, as a light source may be used that comprises vertical and horizontal components (e.g., in an array). Where the 1D variant must light the display on a row-by-row basis, the 2D variant may be capable of providing a significantly improved frame rate because it is not dependent on the oscillating mirror to provide for the vertical component of an image. To further improve the frame rate, the light source of a 2D waveguide display may be bonded to the controller and/or memory providing driving instructions for the display system. For example, may be bonded to the memory that holds the color instructions for the display and/or the driver transistors. The result of such a configuration is that the light source for such a display may be operable with a considerably faster frame rate. In some embodiments, a HMD may comprise multiple light sources, each configured to emit a particular color. Many suitable display light source technologies are contemplated, including, but not limited to, liquid crystal display (LCD), liquid crystal on silicon (LCOS), light-emitting diode (LED), organic LED (OLED), micro-LED (μLED), digital micromirror device (DMD), any other suitable display technology, or any combination thereof. The colors may be combined by a coupling component of a waveguide system that directs the light along a total internal reflection path to a user's eye. Furthermore, projected light may first pass through a small air gap between the light source and the waveguide before interacting with a coupling element, incorporated into the waveguide. The path, in some examples, can include grating structures or other types of light decoupling structures that decouple portions of the light from the total internal reflection path to direct multiple instances of an image, "pupil replications," out of the waveguide at different places and toward an eyebox of a HMD.

Near-Eye Displays and Waveguides

Figure 2:
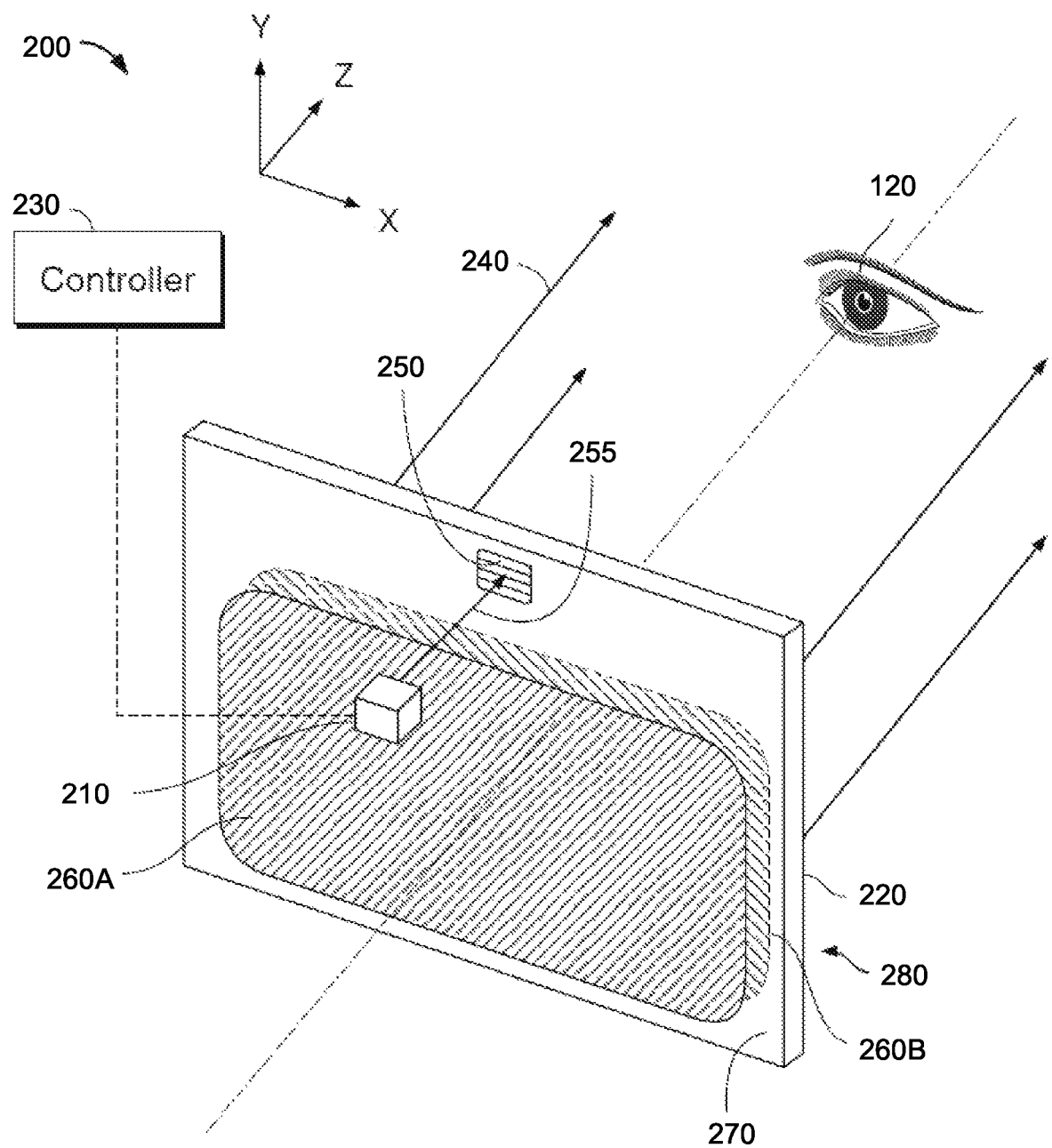
FIG. 2 illustrates an isometric view of an example display system.

FIG. 1 provides an illustration of an example NED. FIG. 2 illustrates an isometric view of a near-eye display system or NED 200, according to some embodiments. In some embodiments, the NED 200 may be a component of the HMD 100. In alternate embodiments, the NED 200 may be part of another HMD or other system that directs image light to a particular location.

The NED 200 may include at least one projector 210, a waveguide 220, and a controller 230. For purposes of illustration, FIG. 2 shows the NED 200 associated with a single eye 120, but in some embodiments another projector, waveguide or controller, that is completely separate or partially separate from the NED 200 may provide image light to another eye of the user. In a partially separate system, one or more components may be shared between the waveguides for each eye. In some instances, a single waveguide 220 may provide image light to both eyes of the user. Also, in some examples, the waveguide 220 may be one of multiple waveguides of a waveguide configuration.

The projector 210 may generate light including one or more two-dimensional images. The projector 210 may include one or more optical sources, an optics system, and circuitry to correct emitted light for non-uniformities and other errors caused by the optical sources, optics system, or any other component of the projector 210 or waveguide 220. The projector 210 may generate and project image light 255, including at least one two-dimensional image, to a coupling area 250 located on a top surface 270 of the waveguide 220. The image light 255 may propagate along a dimension or axis toward the coupling area 250. For example, the projector 210 may comprise one or more array light sources. Although this disclosure will refer to a display based on an array of μLEDs, the techniques and architectures described herein may be applicable to many other suitable types of displays (e.g., liquid crystal on silicon (LCOS), liquid crystal displays (LCD), organic light-emitting diode (OLED), or digital micromirror device (DMD).

The waveguide 220 may be an optical waveguide that outputs two-dimensional images in image light 240 directed to the eye 120 of a user. The waveguide 220 may receive the image light 255 at a coupling area 250, which may include one or more coupling elements located on the top surface 270 and/or within the body of the waveguide 220, and may guide the received image light 255 to a propagation area of the waveguide 220. A coupling element of the coupling area 250 may be, e.g., a diffraction grating, a holographic grating, one or more cascaded reflectors, one or more prismatic surface elements, an array of holographic reflectors, a metamaterial surface, or some combination thereof. In some configurations, each of the coupling elements in the coupling area 250 may have substantially the same area along the X-axis and the Y-axis dimensions and may be separated by a distance along the Z-axis (e.g., on the top surface 270 and the bottom surface 280, or both on the top surface 270 but separated by an interfacial layer (not shown), or on the bottom surface 280 and separated with an interfacial layer or both embedded into the body of the waveguide 220 but separated with the interfacial layer). The coupling area 250 may be understood as extending from the top surface 270 to the bottom surface 280. The coupling area 250 may redirect received image light, according to a first grating vector, into a propagation area of the waveguide 220 formed in the body of the waveguide 220 between decoupling elements.

A decoupling element 260A may redirect the totally internally reflected image light from the waveguide 220 such that it may be decoupled through a decoupling element 260B. The decoupling element 260A may be part of, affixed to, or formed in, the top surface 270 of the waveguide 220. The decoupling element 260B may be part of, affixed to, or formed in, the bottom surface 280 of the waveguide 220, such that the decoupling element 260A is opposed to the decoupling element 260B with a propagation area extending therebetween. The decoupling elements 260A and 260B may be, e.g., a diffraction grating, a holographic grating, an array of holographic reflectors, etc., and together may form a decoupling area. In some embodiments, each of the decoupling elements 260A and 260B may have substantially the same area along the X-axis and the Y-axis dimensions and may be separated by a distance along the Z-axis.

In some embodiments, one or more controllers (such as the controller 230) may control the operations of the projector 210. The controller 230 may generate display instructions for a display system of the projector 210. The display instructions may include instructions to project or emit one or more images. In some embodiments, display instructions may include frame image color data. The display instructions may be received from, e.g., a processing device included in the HMD 100 of FIG. 1 or in wireless or wired communication therewith. The display instructions may further include instructions for moving the projector 210 or for moving the waveguide 220 by activating an actuation system. The controller 230 may include a combination of hardware, software, and/or firmware not explicitly shown herein so as not to obscure other aspects of the disclosure.

Multi-Projector Head-Mounted Display

Figure 3:
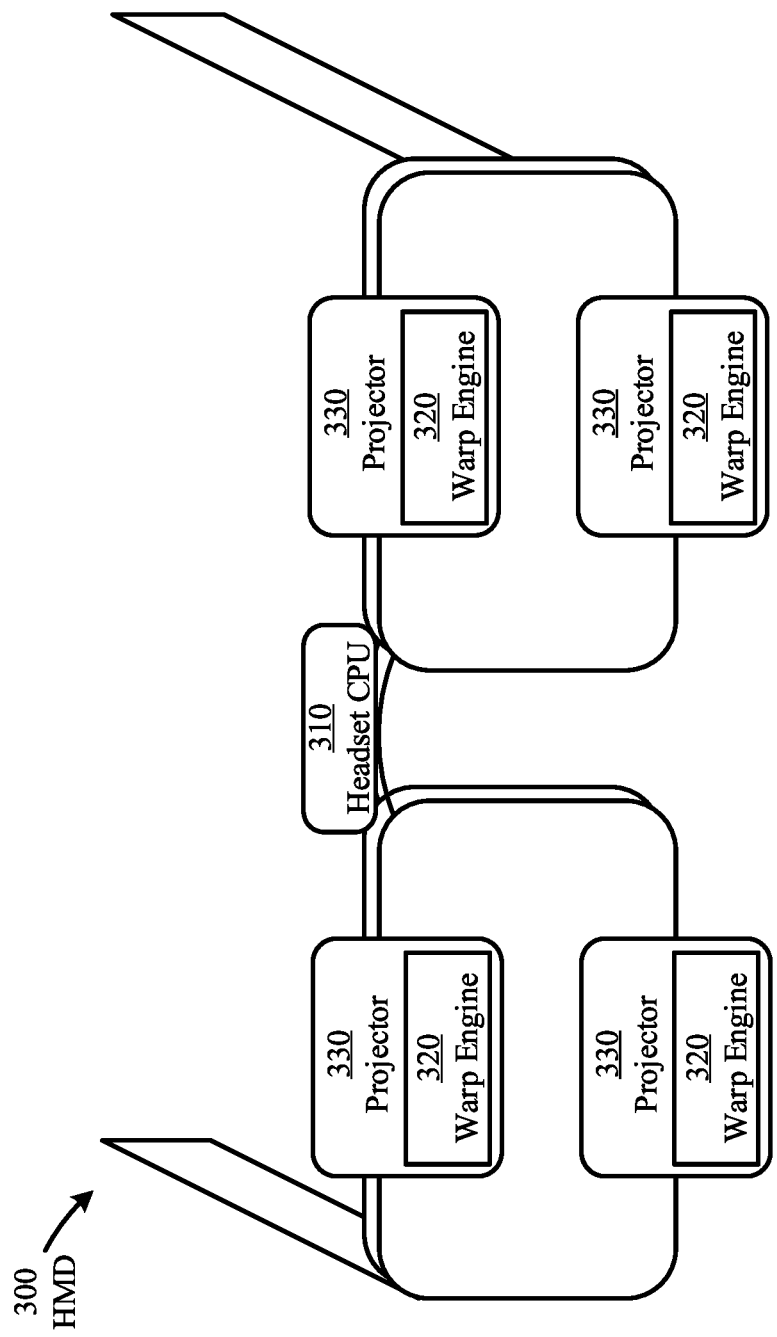
FIG. 3 illustrates an example layout of components for a head-mounted display system.

FIG. 3 illustrates an example of a HMD 300, including an arrangement of particular components of the HMD 300. For example, FIG. 3 illustrates an arrangement of an HMD 300 with multiple projectors per eye. As described above, and in further detail herein, a HMD may comprise multiple projector integrated circuits (each comprising internal components) coordinated by a headset CPU. In the illustrated embodiment, the HMD 300 includes one headset CPU 310 and four projectors 330, each projector 330 including one warp engine 320. As described below, a warp engine 330 may be a component of a display system used with a NED to generate and project quickly updated frames to the user. In particular embodiments, the headset CPU 310 and projectors 330 that comprise the HMD 300 may be realized through one or more integrated circuits. For example, although illustrated as being integrated with a projector 330 distinct from the headset CPU 310, the warp engines 320 may be embodied as a series of operations performed by the same IC as the headset CPU 310. Many suitable arrangements of the components of a HMD 300 illustrated in FIG. 3 may be possible.

The HMD 300 may be configured such that each eye of the viewer receives an image emitted by multiple projectors 330. The viewer's FOV (and the area of responsibility of each projector 330) may be divided. The FOV may be divided evenly or, in some embodiments, may be divided with a bias towards an area where the viewer is more likely to spend their time looking at the image. Furthermore, the area of responsibility for each projector 330 may overlap with one or more other projectors 330. In the case of two projectors 330 per eye (illustrated in FIG. 3) the field of view may be divided vertically (as in the illustrated embodiment) or divided horizontally, based on the location of the various components and the configuration of a waveguide responsible to direct the light emitted by the projector to the user. In particular embodiments, each warp engine 320 may support multiple projectors 330. As explained in detail below, each projector may emit one or more colors. For example, there may be a single warp engine 320 for each eye, or even a single warp engine for the entire HMD 300. In particular embodiments, there may be multiple headset CPUs 310. For example, there may be one headset CPU 310 to process the image for each user eye.

Rendering Frames for Artificial Reality

Since its inception, artificial reality (e.g., AR, VR, MR) technology has been plagued with the problem of latency in rendering AR/VR/MR objects in response to sudden changes in a user's perspective of an AR/VR/MR scene. To create an immersive environment, users may need to be able to move their eyes or heads around when viewing a scene and the environment may need to respond immediately by adjusting the view presented to the user. Each eye movement or head movement may slightly change the user's perspective of the scene. These movements may be small but sporadic and difficult to predict. A problem to be solved is that the eye/head movements may occur quickly, requiring that the view of the scene be modified rapidly to account for changes in perspective that occur with the movements. If this is not done rapidly enough, the resulting latency may cause a user to experience a sensory dissonance that can lead to virtual reality sickness or discomfort, or at the very least, a disruption to the immersive nature of the experience.

The quality of an artificial reality experience is thus limited by the restrictions of the technology used to render and display the artificial reality scene. Re-rendering a view in its entirety (e.g., generating virtual objects from polygons) to account for a user's changes in perspective may be resource intensive, and it may only be possible to do so at a relatively low frame rate (e.g., 60 Hz, or once every 1/60th of a second), which is low enough for some users to detect and discern from reality. For example, a view may include dozens of virtual objects, each of which may be represented by hundreds or thousands of individual polygons. To properly determine the effect of a perspective shift, the thousands of polygons must be rendered again with new input information regarding the viewer's position. This processing requires a significant amount of computing power and limits the maximum output of a renderer, often limited to 30-60 Hz. A renderer with enough power to reach higher frame rates is often not commercially feasible or is unsuitable for particular use cases such as portable operations including laptop systems or HMDs where power consumption may require careful monitoring.

It may be beneficial to divide the workload of rendering and re-rendering a virtual scene so that steps in the rendering process that must be updated more quickly (e.g., adjusting for small movements of the eye) are performed on specialized ASICs on a HMD, and possibly closer to the eye itself.

Other, more computationally intensive tasks (e.g., rendering virtual objects from polygons) may be performed by one or more other rendering components, more removed from the HMD. The rendering components may be in wireless or wired communication with the HMD. The embodiments described herein relate to the division of workload and to the design and implementation of specialized components of an artificial reality system, including a primary rendering engine, head-mounted display, and sub-components thereof.

Primary Rendering Engine

In particular embodiments, a rendering engine may produce images to be displayed to a viewer. The rendering engine may be any suitable component for generating primary image frames. For example, the rendering engine may comprise a graphics processing unit of a standalone device such as a laptop or desktop computer, video game console, or any other suitable local graphics rendering system. The rendering engine may comprise a device easily-worn on the user's body, such as a cellphone, tablet, or any other suitable compact graphics rendering system. In particular embodiments, the rendering engine may be capable of real-time rendering of interactive graphics based on three-dimensional ("3D") models defined by a plurality of polygons (or vertices for polygons) and associated color data and rendering instructions. The rendering engine may further receive information about a viewer's perspective into the virtual scene (e.g., the location of a HMD worn by a user relative to the rest of the virtual scene). The rendering engine may process the polygons and color data and produce rendering data. Due to the high processing requirements of rendering high-quality, complex virtual objects, the rendering engine may be capable of rendering frames at a relatively low rate, e.g., 30-60 Hz. In particular embodiments, the rendering data generated by the rendering engine may include pixel color values, pixel color locations, or one or more other data primaries associated with the image frame The rendering engine may receive primary rendering data for a rendering request. The primary rendering data may include two- or three-dimensional models, textures, and instructions for rendering computer-generated images, and other suitable information. The rendering engine may perform steps to render aspects of an artificial reality scene based on the received primary rendering data. For example, the rendering engine may perform visibility computations using ray tracing, rasterization, or other suitable techniques to determine which polygons of which 3D models of virtual objects in a virtual scene are visible through which pixels of a display. Based on the visibility determinations, the rendering engine may perform shading computations to determine the appropriate color for each pixel. In particular embodiments, the rendering engine may process compressed or decompressed streaming video data. The rendering engine may produce image frames or other data that may be used by other components of the artificial reality system to generate an image to be display to a user.

Surfaces

In particular embodiments, the output of the rendering engine may include one or more specialized object primitives, e.g., "surfaces," for use by a warp engine or a display system. Surfaces may comprise information used for rendering one or more virtual objects of an artificial reality scene. As an example, the rendering engine may generate surfaces by first rendering 2D images from 3D models, as in a typical rendering pipeline. The rendering engine may then generate surfaces from the 2D images using an additional post-processing method. As another example, the rendering engine may directly output surfaces from 3D models, eliminating extra steps directed only to rendering 2D images. As another example, the rendering engine may output 2D images from 3D models to a warp engine. The warp engine may generate surfaces using an additional post-processing method based on the 2D images.

Surfaces may comprise information useful for rendering one or more virtual objects of an artificial reality scene. The information may include location and/or position data for the surface in the scene, specified in the coordinate system of the view space relative to the virtual camera/viewer. Alternatively, the location of the surface may be specified in any other suitable coordinate system, such as the world space coordinate system. The surface may further include texture data, represented by one or more texel arrays. Thus, in particular embodiments, a "surface" may be considered as a rectangular texture with a transformation matrix to specify its location within a scene. Each texel in the texel array may have color information and a 2D coordinate within the texel array (e.g., specified in (u, v) coordinates). In particular embodiments, the color information of each texel may indicate the intensity of several color channels (e.g., red, green, and blue) and alpha information that indicates the texel's transparency level (e.g., completely transparent, completely opaque, or somewhere in between). In other embodiments, the color information of a texel may indicate the intensity of red, green, and blue without separately specifying the transparency level. In this case, the value for each color may be pre-multiplied by the texel's associated transparency level (e.g., if the texel is fully transparent with an alpha level of 0, then the red, green and blue values for that texel would all be zeroed-out by being multiplied by the 0 alpha level).

The texture data of a surface may be generated based on the result of a graphics rendering pipeline, embodying techniques to optimally determine the colors that should be displayed by the pixels of a display or image based on the perspective of a viewer in a three-dimensional scene. In particular embodiments, the surfaces may be limited (e.g., a maximum of 16 surfaces or any other suitable number of surfaces) to ensure sufficient simplicity in the scene so that performance demands can be met (e.g., so that a warp engine may output frames at a suitable rate). Therefore, certain virtual objects in the artificial reality scene may be grouped. Each surface may be a representation of one or more objects or sets of points within the scene that are expected to move/translate, skew, scale, distort, or otherwise change in appearance together, as one unit, as a result of a change in a user's perspective of the scene (e.g., resulting from a HMD on a user's head moving to a different position and/or orientation).

The rendering engine may communicate with a HMD through one or more wired or wireless connections. In particular embodiments, a user may be able to select how the rendering engine and HMD 100 communicate based on the user's needs. In particular embodiments, a warp engine (e.g., warp engine 320) may be incorporated into the HMD. The warp engine may be configured to receive data, such as surfaces and other rendering instructions, from the rendering engine. In particular embodiments, the warp engine and a display system may be logical blocks with operations shared by a single integrated circuit or set of integrated circuits. A HMD may further comprise additional components that facilitate the rendering and display of an artificial scene including additional image processing components, movement detection components, orientation detection components, eye-tracking components, heat detection components, any other suitable components, or any combination thereof.

Projector Architecture

As described previously, this disclosure relates to the design and arrangement of components of a HMD. One such component is described herein as a "projector integrated circuit" or "projector." A projector may comprise components for handling tasks required to convert the image data received from a primary rendering engine into images to be displayed to a user (e.g., a wearer of an HMD). These tasks may include, but are not necessarily limited to, applying modifications to the image data to account for changes in user's position relative to a virtual scene, sampling surfaces of the image data to determine pixel colors, applying a variety of image processing techniques to correct and enhance the pixel colors, converting the pixel colors into instructions for an array of light emitters, and emitting light to the wearer (e.g., through a waveguide configuration).

Figure 4:
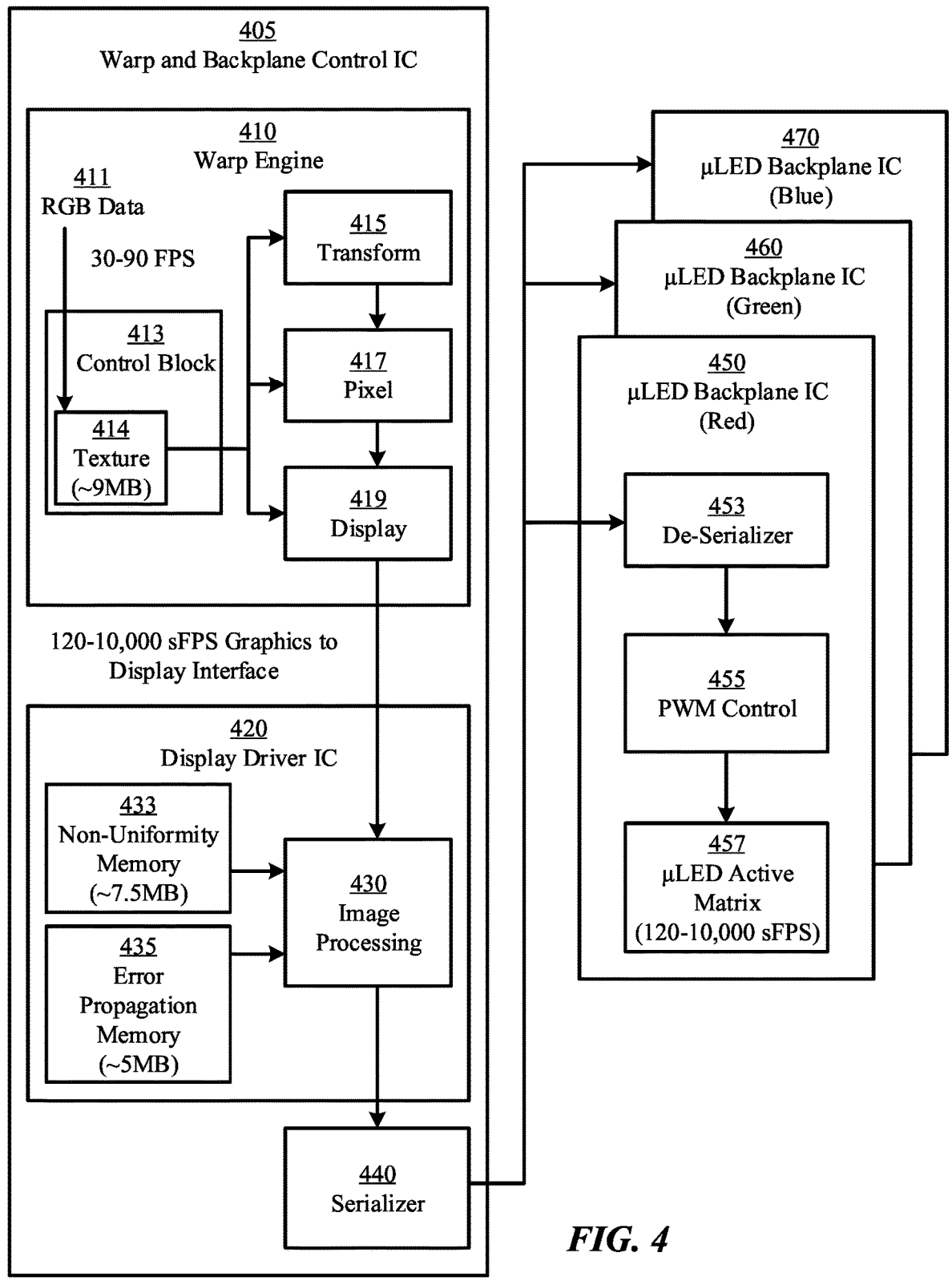
FIG. 4 illustrates an example architecture for a projector.

FIG. 4 illustrates an example architecture of a projector 400 (e.g., projector 330) that may be incorporated in a HMD. The projector 400 may include a warp and backplane control IC 405 and one or more backplane controllers, e.g., μLED backplane ICs 450, 460, and 470. The architecture shown in FIG. 4 features a single warp and backplane control IC 405 that provides data for three μLED backplane ICs 450, 460, and 470 each with a monochrome μLED active matrix 457. Additionally or alternatively, several other suitable display technologies may be used (e.g., LED, OLED, LCD, LCOS, DMD, etc.). The μLED backplane ICs may be identified by the color of the monochrome μLED matrix. For example, μLED backplane IC 450 may comprise a red μLED matrix 457, μLED backplane IC 460 may comprise a green μLED matrix, and μLED backplane IC 470 may comprise a green μLED matrix. Besides the difference in color of the μLED active matrix 457, the μLED backplane ICs may otherwise comprise identical components. If any differences in the configuration are required to allow the differently colored μLED matrices to function, they should be understood to be included, even if not illustrated.

Warp and Backplane Control IC

The warp and backplane control IC 405 may comprise a warp engine 410 and a display driver IC 420. The warp engine 410 may be configured to receive an RGB color data 411 input stream (e.g., in the form of a bitmap file type) at a rate of 30-90 Hz (e.g., 30-90 frames per second). For each frame received by the warp engine 410, the warp engine 410 may prepare and output dozens of sub-frames. The warp engine 410 may process the color data and produce sub-frames of an image to be displayed at a rate of 120 Hz-10 kHz (e.g. 120-10,000 sFPS). Each sub-frame may use the original frame as a base and perform geometric warps to the surfaces of the frame to adjust for changes in the viewer's position relative to the virtual scene since the frame was produced. The sub-frames produced by the warp engine 410 may be provided to the display driver IC 420. The display driver IC 420 provides an interface between the warp engine 410 and the μLED backplane ICs 450, 460, and 470. The display driver IC 420 may also perform dithering and non-uniformity correction operations to account for the particularities of the μLED backplane ICs.

Warp Engine

In particular embodiments, the warp engine 410 may determine the images to be shown to a user of an artificial reality system (e.g., HMD). In particular embodiments, the warp engine 410 may calculate one or more three-dimensional geometric warps of the image based on the image data and other received information. These operations may improve the quality and/or accuracy of images to be displayed to a user (e.g., improving placement of images relative to the user's physical position in a space). The warp engine 410 may comprise four top-level blocks. As shown in FIG. 4, these blocks may include a control block 413, a transform block 415, a pixel block 417, and a display block 419. One or more of the components of the warp engine 410 may be configured to communicate via one or more high-speed buses, shared memories (e.g., texture memory 414), or through any other suitable method. In particular embodiments, the control block 413 of warp engine 410 may be configured to communicate with a transform block 415, pixel block 417, and display block 419 of two or more mirrored pipelines (not shown). In particular embodiments, each pipeline of warp engine 410 may be dedicated to preparing images for a separate display corresponding to a user's left and right eye, or a portion thereof. This communication may include data as well as control signals, interrupts and other instructions. The pipelines may be capable of operating independently of the other.

In particular embodiments, the control block 413 may receive an input data stream from a rendering engine and initialize a pipeline in the warp engine 410 to adjust the frame for display. In particular embodiments, the input data stream may comprise data, such as RGB data 411 and control packets from a primary rendering component. The RGB data 411 and control packets may include information such as one or more surfaces comprising texture data and position data and additional rendering instructions. The control block 413 may distribute data as needed to one or more other blocks of the warp engine 410 through a texture buffer 414 of the control block 413. The control block 413 may initiate pipeline processing for one or more frames to be displayed. In particular embodiments, a HMD may comprise multiple warp engines 410 and each may comprise its own control block 413.

In particular embodiments, a transform block 415 of the warp engine 410 may determine initial visibility information for surfaces to be displayed in an artificial reality scene. In general, a transform block 415 may cast rays from pixel locations on a display and produce filter commands (e.g., filtering based on bilinear or other types of interpolation techniques) to send to the pixel block 417. A transform block 415 may perform raycasting from the current viewpoint of the user (e.g., determined using inertial measurement units, eye trackers, and/or any suitable tracking/localization algorithms, such as simultaneous localization and mapping) into the artificial scene where surfaces are positioned and may produce results to send to the pixel block 417.

In general, a transform block 415 may comprise a four-stage pipeline, in accordance with particular embodiments. The stages of a transform block 415 may proceed as follows. A ray caster may issue ray bundles corresponding to arrays of one or more aligned pixels, or "tiles." The ray bundles may be warped, before entering the artificial reality scene, according to one or more distortion meshes. The distortion meshes may be configured to correct geometric distortion effects stemming from, at least, a display or waveguide of a HMD. A transform block 415 may determine whether each ray bundle intersects with surfaces in the scene by comparing a bounding box of each tile to bounding boxes for each surface. If a ray bundle does not intersect with a surface, it may be discarded. Tile-surface intersections are detected, and corresponding tile-surface pairs may be passed to a pixel block 417.

In general, a pixel block 417 may determine color values from the tile-surface pairs to produce pixel color values in accordance with particular embodiments. The color values for each pixel may be sampled from the texture data of surfaces received and stored by the control block 413 (e.g., as part of an input data stream). A pixel block 417 may receive tile-surface pairs from a transform block 415 and schedule bilinear filtering. For each tile-surface pair, a pixel block 417 may sample color information for the pixels within the tile using color values corresponding to where the projected tile intersects the surface. In particular embodiments, a pixel block 417 may process the red, green, and blue color components separately for each pixel. A pixel block 417 may then output pixel color values to a display block 419 of the warp engine 410.

In general, a display block 419 may receive pixel color values from a pixel block 417, convert the format of the data to be more suitable for output to the display driver IC 420, apply one or more brightness corrections to the pixel color values, and prepare the pixel color values for output to the display driver IC 420. In particular embodiments, a display block 419 may convert tile-order pixel color values generated by a pixel block 417 into scanline- or row-order data, which may be required by a display. Brightness corrections may include brightness correction, gamma mapping, and certain dithering operations. In particular embodiments, a display block 419 may provide corrected pixel color values, to the display driver IC 420 at a higher rate (e.g., 120 Hz-10 kHz, to support 120-10,000 sFPS).

Display Driver Integrated Circuit—Dithering and Non-Uniformity Correction

The warp and backplane control IC 405 may comprise a display driver integrated circuit 420 that performs a variety of image processing techniques. Note that, while for ease of understanding the display driver IC 420 is discussed as a separate integrated circuit, the elements and functions of the display driver IC 420 may be performed by similar structures incorporated in the warp and backplane control IC 405 directly. The output of the display block 419 may be provided to an image processing block 430 of the display driver IC 420 of the warp and backplane control IC 405. The image processing block 430 may perform dithering and non-uniformity correction operations on the sub-frame images passed to the display driver IC 420 from the display block 419 of the warp engine 405.

The image processing block 430 may perform dithering for pixel color values within the sub-frame. For each pixel of the sub-frame (each possibly corresponding to a μLED of a μLED array) the image processing block 430 may quantize the digital pixel color value to match the degree of precision available to the display (e.g., the degree of color precision producible by the μLEDs of the μLED array. The quantized color may create an error: the difference between the quantized value and the specified pixel color value. The error may be propagated to one or more μLEDs around the μLED. This propagated error may be incorporated into the final color for the surrounding μLEDs. In particular embodiments, the error may be propagated to one or more future frames or sub-frames received from the warp engine 410.

Because of the high sub-frame rate, which may comprise individual sub-frames produced at a much greater rate than the human eye can normally discern, the viewer's eye may integrate multiple displayed sub-frames when viewing the displayed image. This results in a composite perceived frame. For example, small differences (e.g., in color of the same pixel location) between two or more sub-frames may be integrated by the viewer's eye. The image processing block 430, taking advantage of this interpretive process, may adjust the position of and/or time of display (e.g., the number of sub-frames) of one or more pixel colors (e.g., within the array of fixed μLEDs) to produce specific visual effects. Such effects may include, for example, displaying colors at finer gradations than physically available to the μLEDs of the μLED array. Thus, in addition to single-frame spatial dithering, the dithering block 345 may be capable of performing "three-dimensional dithering." In three-dimensional dithering, the error may be propagated in two spatial dimensions (along the horizontal and vertical axes), and temporal dimension (between a first sub-frame and one or more subsequent sub-frames).

The image processing block 430 may also correct for non-uniformities of the display. Non-uniformities may include, for example, and not by way of limitation, one or more malfunctional μLEDs (e.g., μLEDs that produce limited or no light in response to a driving current), color distortions of the display (e.g., μLEDs that display color distortions as the driving current increases and/or decreases), manufacturing errors of the display, varying pixel geometries between color-specific μLEDs, pixel spacing between color-specific μLEDs, and a host of other potential non-uniformities. The high sub-frame rate may provide opportunity to correct the non-uniformities without the user perceiving them.

In particular embodiments, some types of non-uniformities may be corrected by the warp engine 410 while some types of non-uniformities may be corrected by the image processing block 430. Non-uniformities that are expected to have low variation between sub-frames may be corrected by the warp engine 410. For example, non-uniformities introduced by optics associated with the waveguide or light emitting components of a display may be corrected by the warp engine 410. Because these non-uniformities may be consistently measured regardless of the specified pixel color values of the frame, they may be corrected by the more powerful warp engine 410. Non-uniformities introduced by malfunctioning μLEDs of a μLED array may be corrected by the image processing block 430.

In particular embodiments, a mask required to correct for various non-uniformities and to propagate color value errors may be stored within a non-uniformity memory 433 and error propagation memory 435 of the display driver IC 420, respectively. In particular embodiments, the non-uniformity memory 433 may be a 7.5 MB buffer that stores a precalculated mask to reduce the need for just-in-time calculation of each sub-frame translation. In particular embodiments, an error propagation memory 435 may be a 5 MB buffer of the display driver IC 420 that stores previously calculated error propagation values. For example, for each pixel location, a portion of the error value may be designated for a temporal error propagation. While processing the image of the next sub-frame, the image processing block 430 may retrieve the error value for some or all pixel locations. This designated past error value may be used with dithering the current sub-frame. Any error values from the current sub-frame that are designated for temporal dithering may be stored back into the error propagation memory to be accessed while the image processing block 430 is dithering the next sub-frame. The output of the image processing block 430 may be one or more individual μLED color instructions for a sub-frame. In particular embodiments, if the image received from the warp engine 410 has not already been divided into monochrome components, the image processing block 430, or another component of the display driver IC 420 may separate the colors into two or more monochrome portions, so that images may be passed to a μLED backplane IC (e.g., 450, 460, or 470) supporting a monochrome μLED active matrix 457.

Before the output of the image processing block 430 is sent from the display driver IC 420, it may pass through a display interface serializer 440. The display interface serializer 440 may convert the parallelized data received from the image processing block 430 into a serialized format that may be more easily transmitted to a μLED backplane IC 450. Serializing the data before transmission may reduce the complexity of the overall chip design by, e.g., reducing the number of signal lines (e.g., pins) connecting the warp and backplane control IC 405 to each μLED backplane IC 450, 460, and 470. This may in turn help reduce cost and increase yield by decreasing opportunities for manufacturing errors. A de-serializer 453 of a μLED backplane IC 450 may receive the serialized data stream and convert it back into a parallelized stream, suitable for use by the remaining components of the μLED backplane IC 450.

μLED Backplane Integrated Circuit

The μLED integrated circuit of a projector may comprises elements to receive data and control signals from the warp and backplane control IC 405 and convert the data nd control signals into to light to be displayed to a user. FIG. 4 illustrates one potential arrangement for a warp and backplane control IC 405 and μLED backplane ICs 450, 460, and 470 of a projector 400. In some embodiments, and as illustrated in FIG. 4, one warp and backplane control IC 405 may be configured to interface with several μLED backplane ICs 450, 460, and 470. In the case of projector 400, each μLED backplane IC comprises a different monochrome μLED active matrix 457 (μLED backplane IC 450 comprises a red μLED active matrix, μLED backplane IC 460 comprises a green μLED active matrix, and μLED backplane IC 470 comprises a blue μLED active matrix). As discussed above, the light emitted by these μLED matrices may be combined through a waveguide system before being sent to the eyebox of the viewer. In some embodiments, a single warp and backplane control IC 405 may interface with a single μLED backplane IC 450. The μLED backplane IC 450 may in turn comprise a single μLED active matrix, which may in turn be monochrome or polychromatic (e.g., composed of several layered μLED active matrices). The same principles explained herein may apply to all conceived of combinations.

The architecture will be described with respect to a single μLED backplane IC 450. It should be understood that the same concepts may be readily used for the remaining μLED backplane ICs (e.g., μLED backplane projector IC 460 and 470) of a projector 400 as needed. Image data (e.g., pixel color values) may be transmitted to the μLED backplane IC 450. If the data had been serialized (e.g., by a serializer 440 of the warp and backplane control IC 405), the data may be de-serialized by a de-serializer 453 of the μLED backplane IC 450. As described above, serialization may reduce the number of active signal lines required to transmit data and may be more efficient from a pin-count perspective. However, the data may then require de-serialization so that is may be used by the remaining components of the μLED backplane IC 450, including the pulse-width modulation control block 455 and the μLED active matrix 457. The de-serialized data may be passed to a pulse-width modulation (PWM) control block 455.

The PWM control block 455 may interpret the color data and provide the control instructions necessary to perform pulse-width modulations using the μLEDs of the μLED active matrix 457. In particular embodiments, the PWM control block 455 may load pixel color values and other control instructions into memories to be accessed by the μLED active matrix 457. After the data has been loaded, the μLEDs of the μLED active matrix 457 may be illuminated according to the color data and instructions. For example, the PWM control block 455 may provide timing and color instructions so that the μLEDs may be illuminated at a sufficiently fast rate that the viewer's eye perceives only an illuminated display (e.g., does not perceive flicker in the μLEDs). Although this disclosure describes using PWM as a display regulation technique, other approaches for controlling the illumination of a light source may also be used. In particular embodiments, the μLED active matrix 457 may be configured to receive and display the sub-frames in line with the rate at which the data is output by the warp engine 410 (e.g., 120 Hz-10 kHz or 120-10,000 sFPS).

Frame and Sub-Frame Timing

Figure 5:
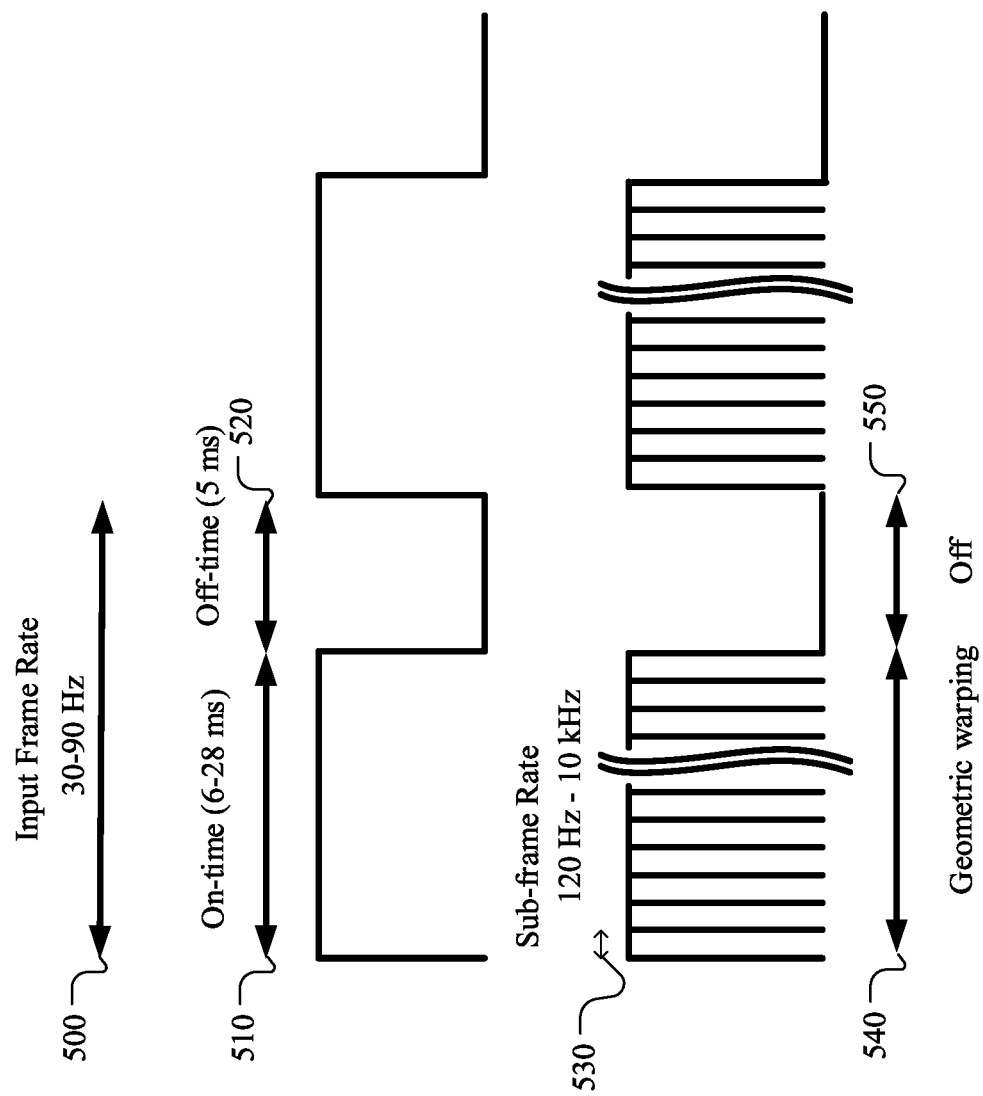
FIG. 5 illustrates an example frame rendering timeline.

As this disclosure contemplates components generating and receiving image frame data at two different frame rates, the following is a brief explanation and example of the effects of sub-frame rates (e.g., up-sampled frames) within a display system. FIG. 5 illustrates an example rendering timeline of two frames which are received and displayed by a display system. The timeline 500 indicates the amount of time for a single frame. As indicated, a display may receive frames at an input frame rate of 30-90 frames per second (30-90 Hz). The input frame rate may indicate the frequency at which updated or refreshed frame data is received. For example, frames (or data permitting the rendering of the frames) may be rendered by a rendering engine and sent to a HMD for display. The input frame rate may represent the frequency at which the rendered data is received by the HMD.

The timeline 510 indicates the amount of time during which one or more light emitters (e.g., LEDs) may be emitting light corresponding to a received frame in a standard display, which may be referred to as the on-time for the light emitter. The on-time for an LED may refer to the time that the LED is outputting light above a specified brightness threshold after current is received by the LED. Thus, the timeline 510 may not include time during which the LED is beginning to emit light but is not emitting at its specified brightness. In particular embodiments, the on-time for an LED in a standard display may be between 6-28 ms (corresponding to 35-167 Hz). The timeline 520 indicates an off-time for the LED. The off-time for an LED may refer to the time during which the LED is not emitting light, such as because current is no longer being supplied to the LED. In particular embodiments, the off-time for an LED in a standard display may be around 5 ms. During the off-time of the LED, the updates from the rendering engine may be received and the ensuing frame data may be prepared for display. Also during the off-time, updates to the frame data may be applied by the rendering engine or the HMD. These updates may include updates to texture data or adjustments made to allow for varifocal lenses to be simulated (or in the case of physical varifocal lenses, the lenses may be moved accordingly).

The timeline 530 indicates the amount of time allocated for sub-frame display according to certain embodiments. In particular embodiments, the display system may receive frames at the input frame rate (e.g., 30-90 Hz) and up-sample the frame into several sub-frames. By up-sampling and displaying sub-frames, the display may increase the effective or perceived frame rate. In particular embodiments, the sub-frame rate may be 120 Hz-10 kHz. The sub-frame rate may be specifically configured to take advantage of a response time of light emitters of the display. In particular embodiments, LEDs in a display may have a power cycle time (e.g., the time from off to on to off again) well below the time required to display a frame at a supplied input frame rate. Based on this, a display system may be configured to modify the frame image data in between input frame updates (e.g., faster than 30-90 Hz) to be displayed by LEDs. For example, in between input frame updates, as indicated by timeline 540, geometric warping may be performed (e.g., by a warp engine 410) to the data provided by a rendering engine. The effects of the geometric warping may be displayed at the up-sampled sub-frame rate. Because new data may be received from the rendering engine during the off-time (indicated by timeline 550), no additional effects may be applied by the display system.

Example Integrated Circuits

Figure 6:
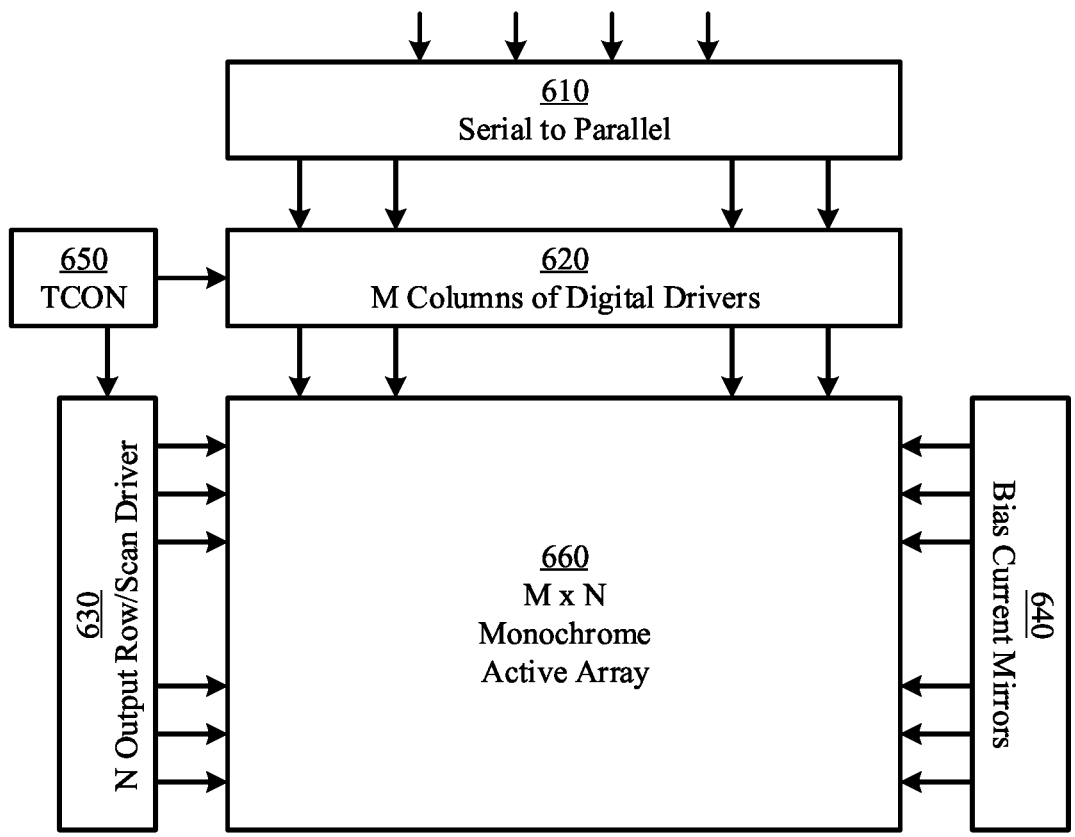
FIG. 6 illustrates an example backplane integrated circuit.
Figure 7:
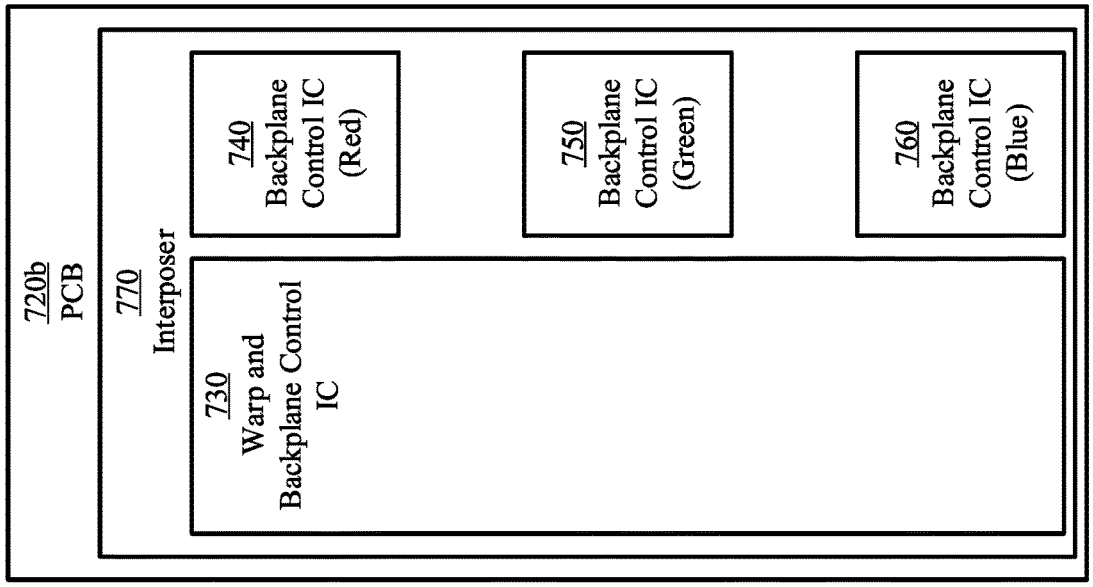
FIG. 7 illustrates a view of example integrated circuit layouts.
Figure 7:
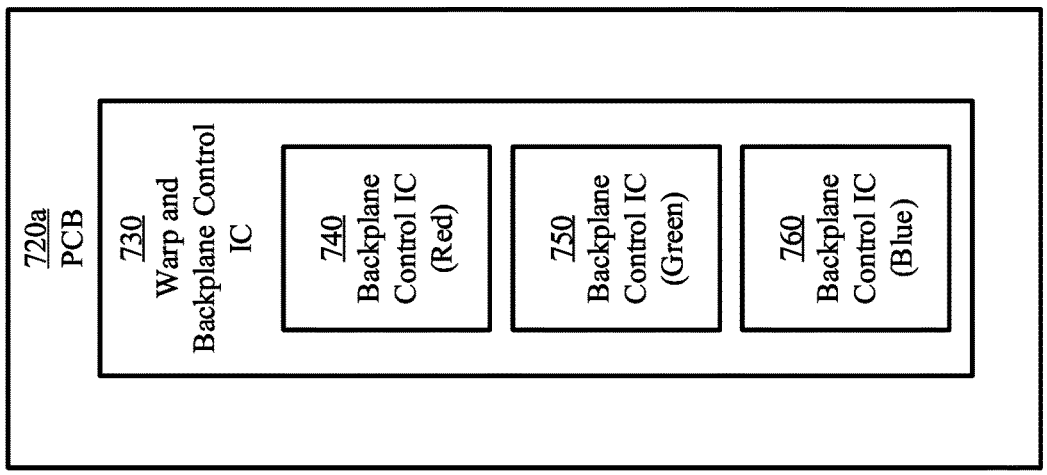

This disclose contemplates a variety of possible designs for the integrated circuits that may be used in a warp and backplane control IC 405 and μLED backplane IC (e.g., 450), and the components of said integrated circuits. FIGS. 6-7 illustrate example architectures of a backplane control IC and projector IC.

Backplane Control IC

FIG. 6 illustrates an example block-level layout 600 for a silicon-based backplane control IC and active μLED array (e.g., μLED backplane IC 450, 460, and 470) employing pulse-width modulation. Block 610 is a de-serializer that de-serializes serialized data (such as data serialized by a serializer block 440 of a warp and backplane control IC 405) into parallelized data. The de-serializing block 610 may be specially configured to de-serialize data from a format specified by the serializer 440. Therefore, the de-serializing block 610 and the serializer 440 may be said to be paired or co-designed. The backplane control IC 600 may use PWM to modulate the output of the μLED array 660. A timing controller (TCON) board 650 may provide timing instructions for the columnar driver board 620 and scanning row board 630. The TCON board 650 may provide, for example, information about the color and/or amount of time that specific light emitters (e.g., LEDs, OLEDs, μLEDs, etc.), should be illuminated so as to provide a color as instructed by the color data stream received from a display driver. In particular embodiments, the timing controller (TCON) board 650 may comprise several individual TCON chips.

Driver 620 may receive instructions to indicate which μLED columns of the μLED active array 660 will include illuminated μLEDs for a given sub-frame. Scanning row board 630 may receive instructions for grounding the rows of the μLED active array 660 (e.g., instructions regarding which μLEDs of which columns will be lit). In particular embodiments, there may be M columns of μLEDs in the array 660 and N rows, where M and N may be any suitable integer. For example, a display may comprise 3840 columns of μLEDs and 2160 rows of μLEDs (e.g., a 4K display resolution). More or fewer μLEDs may be included as deemed advantageous for the display. The TCON board 650 may provide timing instruction to cause the scanning row driver 630 to cycle through the rows of the μLED array to ensure that all μLEDs of the array are emitting at the appropriate time. The bias current mirror 640 may receive a varying driving current and output a base current appropriate for driving μLEDs that is modulated by the drivers 620 and 630. In particular embodiments, the backplane control IC and active μLED array 660 may be implemented with a silicon-based thin-film transistor backplane, as opposed to a glass-based thin-film transistor backplane. The silicon-based backplane may allow the μLED backplane IC 600 to have a smaller form factor, promoting efficiency and lower cost to manufacture without sacrificing display quality.

Projector—2.5D and 3D IC

FIG. 7 illustrates two arrangements 700 and 710 for a projector (e.g., projector 400) of a display system. Arrangements 700 and 710 feature a warp and backplane control IC (e.g., warp and backplane control IC 405) and several backplane control ICs 740, 750, and 760 (e.g., μLED backplane ICs 450, 460, and 470) mounted to a printed circuit board (PCB) for mechanical support and to support electrical connections among the ICs. As in FIG. 4, the backplane control ICs each support a monochrome μLED array, and thus each may be designated by the color it provides (e.g., red, green, or blue).

Arrangement 700 illustrates a variant in which three backplane control ICs 740, 750, and 760 are mounted physically on top of a warp and backplane control IC 730. The vertical stack of ICs is further mounted to a PCB 720a. This stacked variant may also be referred to as a 3D structure because of the increased vertical profile compared to traditional ICs. In the 3D structure, through-silicon vias may be used to allow the backplane control ICs 740, 750, and 760 to communicate with the warp and backplane control IC 730 and to connect to the PCB 720a. A 3D variant may be more space efficient than a traditional 2D variant (e.g., in which all the ICs are mounted on a single plane), as the footprint of the IC can be significantly reduced. The 3D variant may also reduce the interconnection complexity, as individual ICs may communicate directly with other IC s in the stack through highly efficient through-silicon vias.

Arrangement 710 illustrates a variant in which the three backplane control ICs 740, 750, and 760 are mounted next to the warp and backplane control IC 730 on an interposer 770. The interposer 770 (with ICs) is further mounted to a PCB 720b. The interposer 770 may allow for a simulated 3D configuration of the ICs, which may be referred to as a 2.5D configuration. The interposer 770 may be a silicon interposer with through-silicon vias connecting the communication points of the ICs mounted on its top and the PCB 720b. The interposer 770 may allow for faster IC-to-IC communication than would otherwise be achievable in a 2D configuration. For example, depending on the manufacturing techniques used, the interposer may allow for more accurate (e.g., less noisy) connections. Connections between ICs on the interposer 770 may be made using the same materials (such as silicon) and processes as the ICs themselves. Connections between the interposer 770 and PCB 720b may be made using typical techniques. The 2.5D, or "side-by-side" variant may improve speed of communication between the ICs and have a reduced footprint when compared to 2D techniques. The 2.5D variant may also have higher manufacturing yield rates when compared to a purely 3D variant. Furthermore, because individual active ICs can still be separated, heat from the ICs may be naturally less of an issue is it is allowed to dissipate in a manner similar to the 2D variant.

Projector Architectures

Where FIG. 7 illustrates variations on arrangements of the components of a projector, FIGS. 8A-8D illustrate variations on arrangements of the components of an HMD, including variations on different components of projectors embodied in different integrated circuits. FIGS. 8A-8D illustrate possible architectures for a projector (e.g., projector 400) and headset CPU (e.g., headset CPU 310) of a HMD. Each configuration illustrated in FIGS. 8A-8D includes at least one of each of the following components: a headset CPU, a warp engine (e.g., warp engine 410), a display driver IC (DDI) (e.g., display driver IC 420), and a μLED backplane control and matrix (e.g., μLED backplane IC 450, 460, or 470). The options represented in FIGS. 8A-8D can be summarized with a description of their characteristics along three metrics: the number of distinct ICs required, whether the DDI shares an IC with the μLED backplane control and matrix, and the location of the warp engine (e.g., warp engine 410) relative to other components.

Figure 8A:
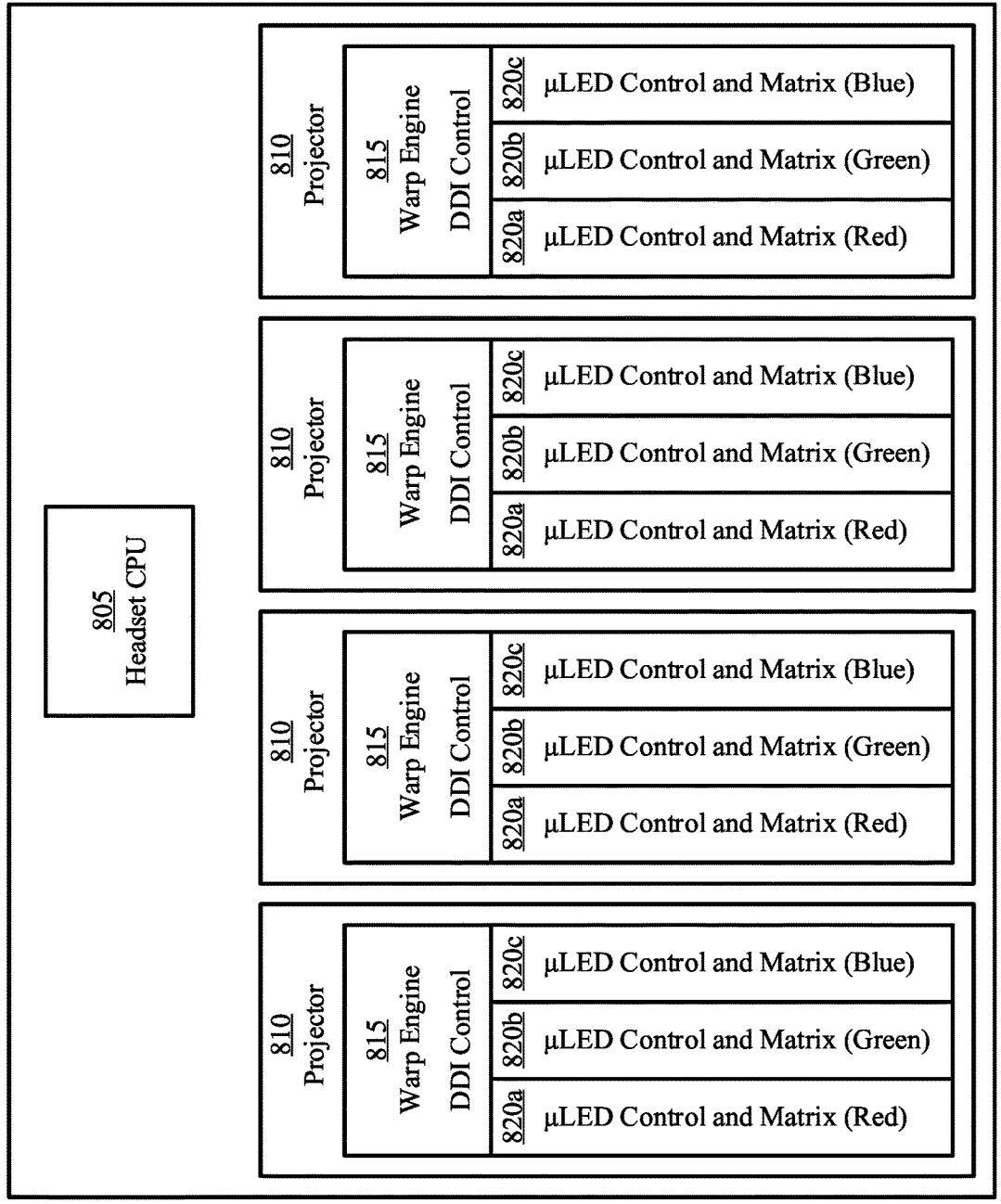
FIGS. 8A-8D illustrate example architectures for head-mounted display system components.

In FIG. 8A, the architecture 800a includes three distinct types of ICs. One IC is the headset CPU 805. A second IC 815 includes a warp engine (e.g., warp engine 410) and a DDI control (e.g., display driver IC 420). A third IC type 820a, 820b, and 820c includes a μLED backplane control and active matrix (e.g., μLED backplane IC 450, 460, and 470). In this configuration, a projector 810 (e.g., projector 400) comprises a warp engine and DDI control ASIC 815 and three μLED backplane control and active matrix ICs 820a, 820b, and 820c integrated into a single chip. Thus, although this configuration may support any number of projectors 810, the headset CPU 805 shown in configuration 800a is supporting four projectors 810. For example, each eye may have two designated projectors 810, splitting the screen vertically or horizontally. Dividing the workload of each projector may improve the field of view for the user without dramatically increasing the cost or complexity (as compared to the potential cost or complexity of achieving the same field of view with fewer projectors).

Each projector 810 shown in FIG. 8A has a dedicated warp engine. This may reduce the expected workload of the warp engine because it need only determine geometric warps for a subset of an frame/sub-frame. Another advantage stems from splitting the warp engine and DDI control ASIC 815 from the μLED active matrix 820a, 820b, and 820c. The operations of the warp engine and DDI control may be referred to as "digital-only," as there is no intrinsic need for either block, as described above, to interface with any analog components. By contrast, the μLED matrix is an analog component, and its controller must interface with it appropriately. Because the warp engine and DDI control ASIC 815 supports digital-only operations, the ASIC itself may be manufactured using the most appropriate manufacturing processes. For example, the warp engine and DDI control ASIC 815 may be manufacturing using smaller components, causing the ICs to be more powerful and/or power efficient than if it were to include interfaces with analog components. In particular embodiments, the projector 810 may be embodied as a 2.5D or 3D ASIC as described above with respect to FIG. 7. Thus, the active signal connections between the warp engine and DDI control ASIC 815 and μLED control and matrix ICs 820a, 820b, and 820c may benefit from the short, direct connections enabled by the side-by-side or stacked design architectures.

In many standard displays (e.g., those with glass-based backplanes), the DDI controller and μLED controller and active matrix must be incorporated into a single IC because the operations of the DDI controller are often inextricably tied to the display matrix. As described above, in certain embodiments, the μLED matrix may use a silicon-based backplane. This, especially when considered alongside the potential for a 2.5D or 3D configuration, has the potential to allow nearly arbitrary division of the operational blocks supporting the μLED display. For example, and as illustrated for the architecture 800a, the warp engine and DDI controller may be separated from the μLED controller and matrix.

Figure 8B:
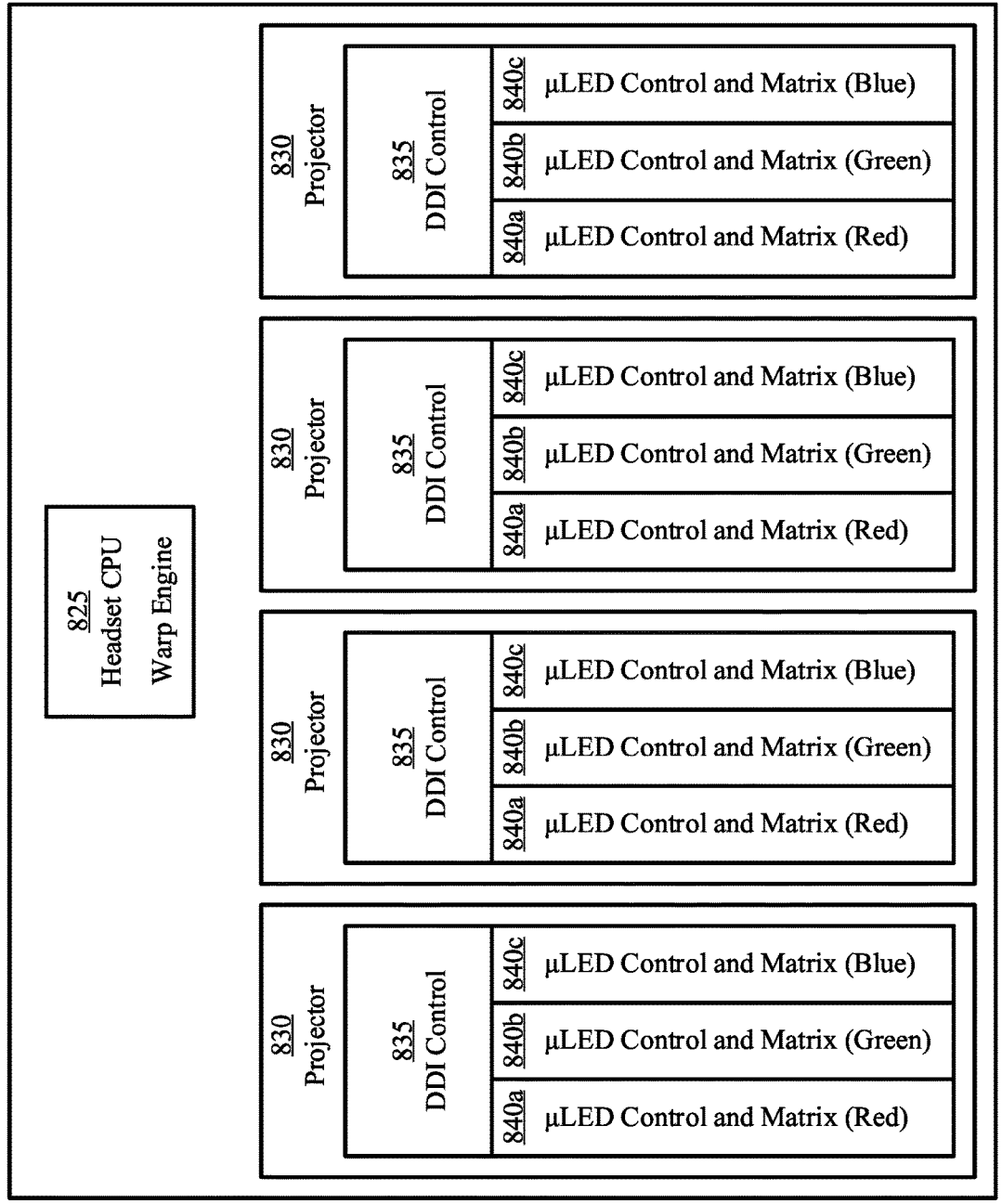

In FIG. 8B, the architecture 800b again includes three distinct types of ICs. One ASIC 825 includes the headset CPU and a warp engine (e.g., warp engine 410). A second ASIC 835 includes a DDI control (e.g., display driver IC 420). And a third ASIC type 840a, 840b, and 840c includes a μLED backplane control and active matrix (e.g., μLED backplane IC 450, 460, and 470). Like the architecture shown in FIG. 8A, the architecture 800b enforces specialization of ICs and allows for the most appropriate manufacturing processes to be used for the ICs (e.g., improving the speed of digital-only ICs compare to hybrid ICs).

Unlike the architecture 800a, the architecture 800b features a partitioned warp engine, which is incorporated in the same IC 825 as the headset CPU. Architecture 800b illustrates a single warp engine, but could support multiple warp engines (e.g., one per eye, one per projector, etc.) operating on the same ASIC 855. Thus, a projector 830 in this configuration includes a DDI controller and μLED active matrix. The partitioned warp engine may benefit from accessing the increased computing power afforded to the headset CPU. This may support the goal of a fast sub-frame generation and display rate (e.g., 120 Hz-10 kHz). Architecture 800b may also allow for simpler, easier to manufacture, and less costly ICs for the projector 830. Furthermore, architecture 800b may further provide many of the advantages of partitioning the DDI controller from the μLED backplane control and μLED active matrix as discussed above.

Figure 8C:
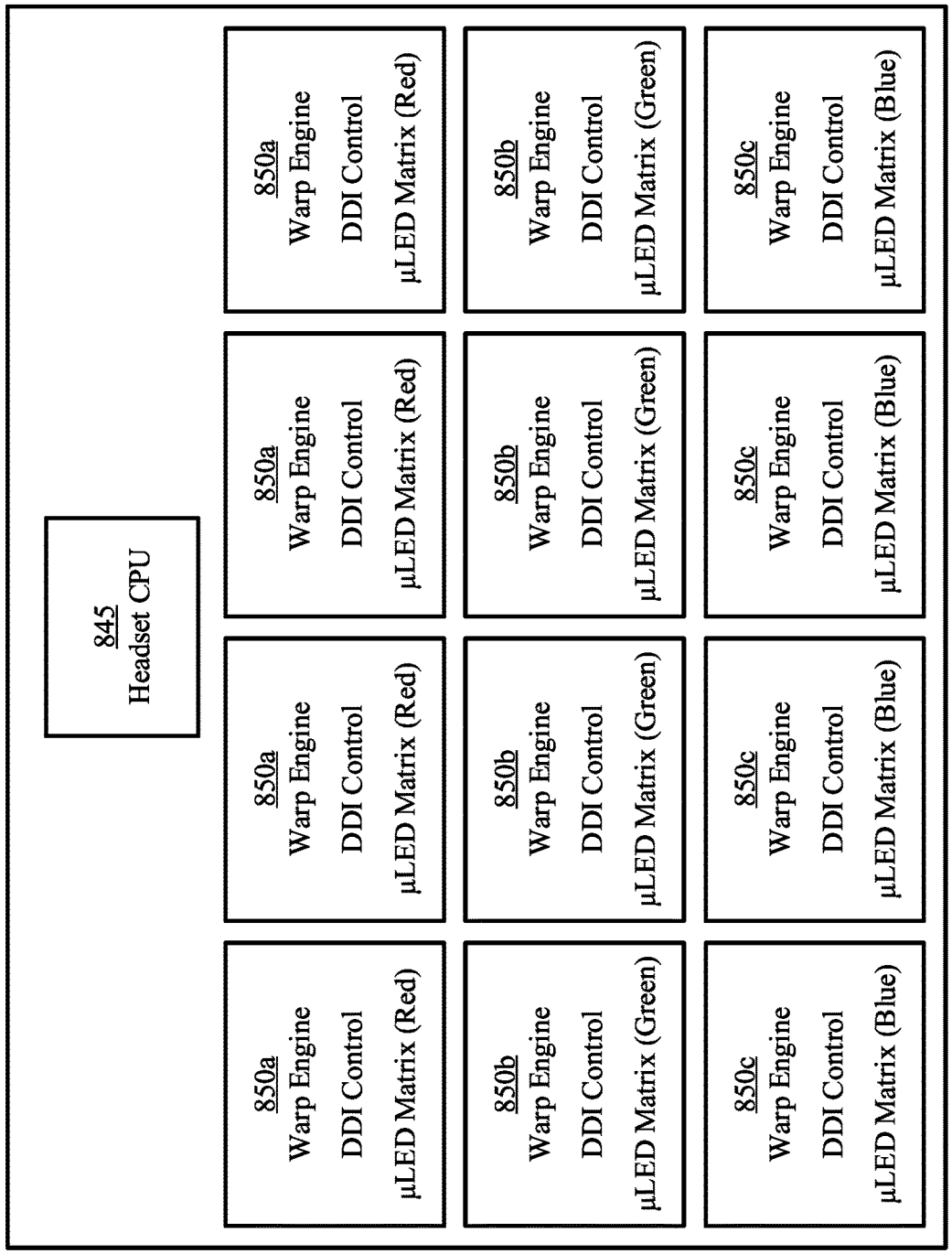

In FIG. 8C, the architecture configuration 800c includes two distinct ASIC types. One ASIC includes the headset CPU 845. A second ASIC 850a, 850b, and 850c includes a warp engine (e.g., warp engine 410), a DDI control (e.g., display driver IC 420) and a μLED backplane control and active matrix (e.g., μLED backplane IC 450, 460, and 470). Thus, a projector under this architecture configuration includes all three of these components on a single chip. FIG. 8C illustrates separate projectors, each with its own monochromatic μLED matrix. Thus, this configuration would support an HMD with six projectors per eye, creating two full-color displays to divide the FOV.

Each projector has a dedicated warp engine, possibly increasing accuracy and efficiency of the individual warp engine components. In particular embodiments, each warp engine may be optimized based on the color channels of the monochrome μLED matrix it supports. For example, a warp engine performing initial visibility checks for only the red color channel of an image may be optimized separately from a warp engine doing the same for the green color channel. Moreover, the color blending performed by the pixel block of such a warp engine may be highly optimized as it can avoid considerations for the green or blue color channels. Architecture 800c calls for only two distinct types of ICs which simplifies manufacturing requirements and may end up promoting greater yields of viable ICs, as manufacturing can be focused on creating just these two types of ICs. This may also simplify integration, as it limits the types of ICs that must be integrated into the HMD.

Figure 8D:
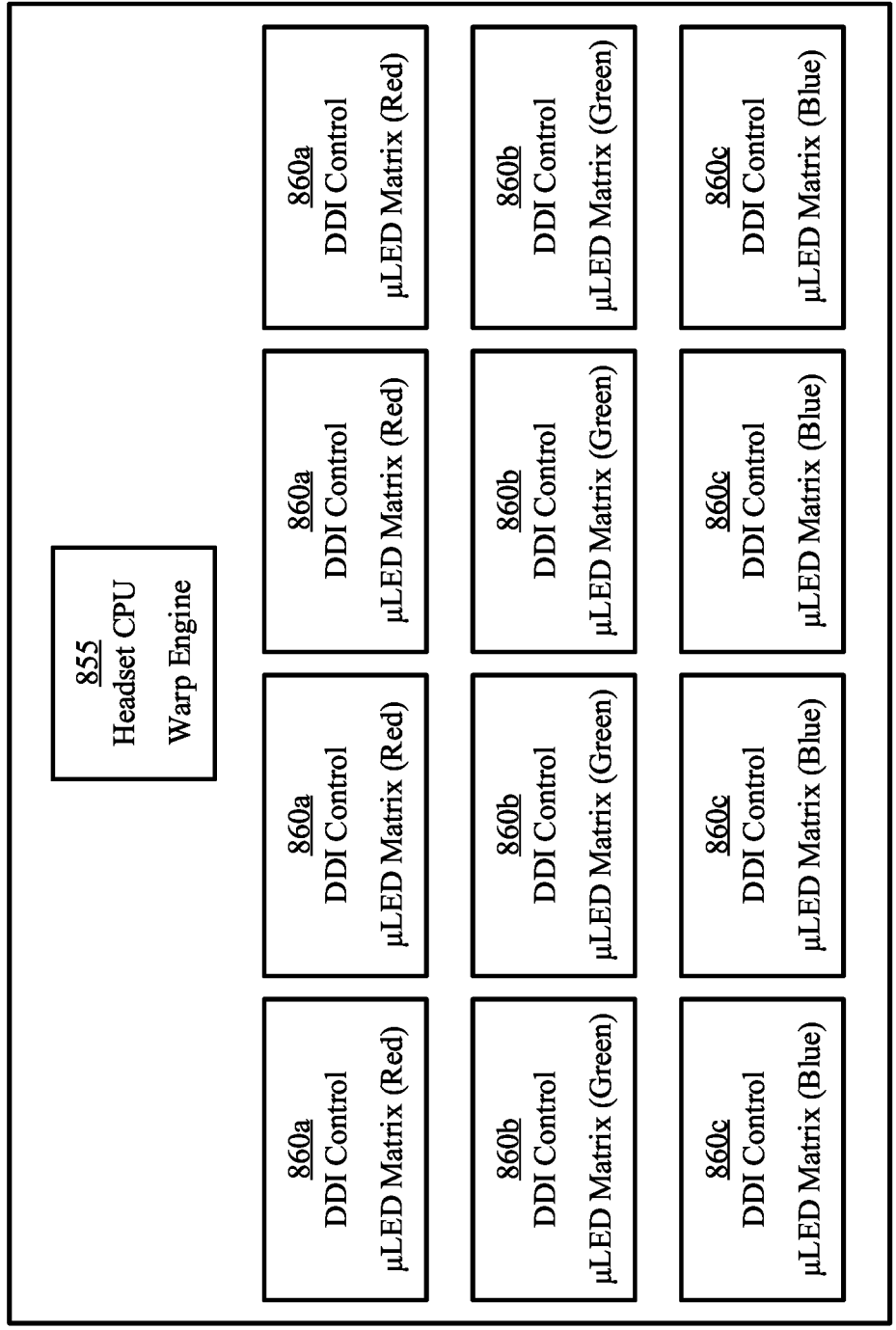

In FIG. 8D, the architecture 800d again includes two distinct types of ICs. One ASIC 855 includes the headset CPU and warp engine (e.g., warp engine 410). A second ASIC type 860a, 860b, and 860c includes a warp engine (e.g., warp engine 410), a DDI control (e.g., display driver IC 420), and a μLED backplane control and active matrix (e.g., μLED backplane IC 450, 460, and 470). This configuration illustrates a single warp engine, but could support multiple warp engines (e.g., one per eye, one per projector, etc.) operating on the same ASIC 855.

In addition to the benefits of incorporating only two distinct ICs, architecture 800d may have additional benefits in that the projector ASIC 860a, 860b, 860c includes components, the DDI controller and μLED matrix, that may be the most straightforward to conceptually group together. Each DDI controller is paired with a monochrome μLED matrix, and the DDI controller may be optimized to support the color channel of the particular μLED colors used. For example, a DDI controller supporting a red μLED matrix may have distinct optimizations to improve the color balance of red μLEDs from a DDI controller optimized to support blue μLEDs. The arrangement 800*d* may also reduce the complexity of data routing between the headset CPU and warp engine ASIC 855 and each individual projector ASIC 860*a*, 860*b*, and 860*c*. Because only a single color channel is sent to each DDI controller, less information may be sent through the active signal channels at once while still achieving comparable throughput speeds to an arrangement in which a single DDI controller supports multiple monochrome μLED arrays.

The choice of which architecture is most appropriate for a particular application may depend on a variety of considerations. For example, certain ICs that may be used in an architecture may be more expensive to manufacture relative to other ICs that may be used. Therefore, decreasing the total number of the expensive ICs used in a given configuration may be preferable. As another example, and as has been discussed above, it may be beneficial to reduce the number of unique ASICs that will be required in a given configuration. Designing an additional ASIC to perform the role of a functional block may be difficult and expensive. It may be more cost efficient to only design and manufacture two distinct ICs so that efforts may be focused on improving the yield of reliable samples of those ICs. As another example, it may be determined that certain ICs may draw more power than others. For example, it may be determined that power required for a configuration with four warp engines is lower than one with twelve. It may be further determined that certain combinations of blocks into a single IC may affect the power requirements. For example, it may be determined that a configuration in which the warp engine and headset CPU are combined has a higher power requirement than one in which the warp engine is combined with a DDI control and/or μLED backplane control and active matrix. As another example, the amount of heat produced by certain ICs may be considered. All these factors, and any other suitable factors, may be considered when designing a projector architecture, and in particular, choosing one architecture over another for a particular application.

Projector IC Packaging

Figure 9A:
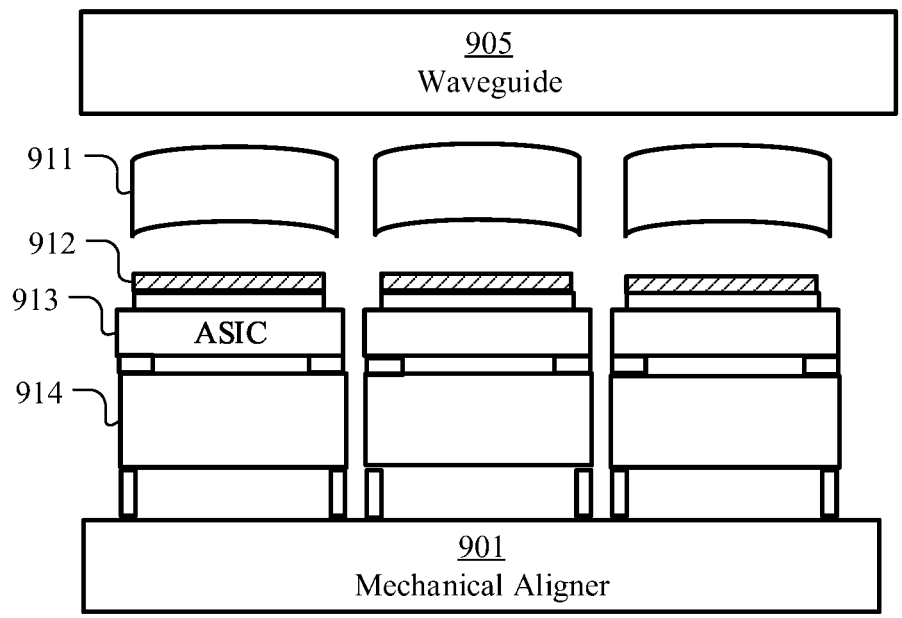
FIGS. 9A-9E illustrate example arrangements of components for a head-mounted display system.

FIGS. 9A-9E illustrate several packaging options for the logical configurations of a projector discussed above. As described in further detail, the choice of architecture configuration 800*a*-800*d* may inform, or require, the choice of a specific packaging option. FIG. 9A illustrates a configuration in which a mechanical aligner 901 is capable of adjusting the position of a stack of components relative to a waveguide 905 of a HMD. FIG. 9A illustrates three ASICs 913, each with their own monochromatic μLED array 912. For example, the packaging option illustrated in FIG. 9A can support, for a single projector, one ASIC 913 and monochromatic μLED array 912 to display a red color channel, one ASIC 913 and monochromatic μLED array 912 to display a green color channel, and one ASIC 913 and monochromatic μLED array 912 to display a blue color channel. Any suitable color channel for the μLED array may be used. Similarly, a polychromatic μLED array may also be used. Each monochromatic μLED array 912 has an associated coupling component 911 to couple the light emitted from the various μLED arrays 912 into a single image. The ASICs 913 are each bonded to a circuit board 904 which is in turn mounted to the mechanical aligner 901. In particular embodiments, the circuit board 914 may be a rigid flex circuit board, allowing the circuit 914 to move as needed under the control of the mechanical aligner 901. The mechanical aligner 901 may be controlled by a controller of the HMD (e.g., a headset CPU). In this embodiment, the mechanical aligner 901 may position each ASIC 913 and μLED array 912 independently of the other AISCs 913 and μLED arrays 912.

Figure 9B:
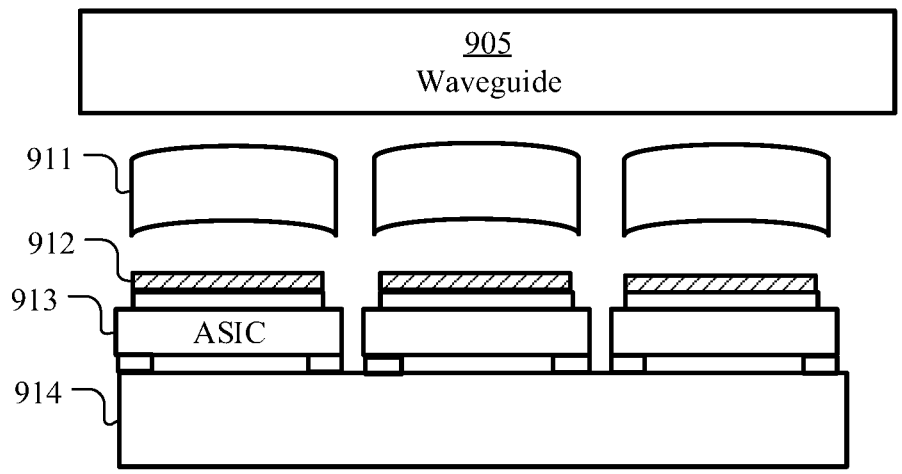

FIG. 9B illustrates a configuration, similar to that shown in FIG. 9A, but without the mechanical aligner 901. In FIG. 9B, the ASICs 913 are each mounted to the same circuit board 914 for mechanical and electrical support. Thus, FIG. 9B illustrates a simpler variation on the configuration illustrated in FIG. 9A. FIG. 9B may be said to illustrate a 2D approach to the packaging of the ASIC described above. The ASICs 913 are all mounted on the same plane and to the same circuit board 914. Thus, the configuration can be made using well-understood manufacturing processes, reducing cost and increasing yield. However, the 2D configuration has a number of known limitations, including at least that the resulting circuits take up more horizontal space. In handheld devices and HMDs, this space may be at a premium and thus a 2D solution may not be viable for all use cases. Furthermore, the ASICs 913 cannot communicate directly with other ASICs 913 without additional wiring complexity.

Figure 9C:
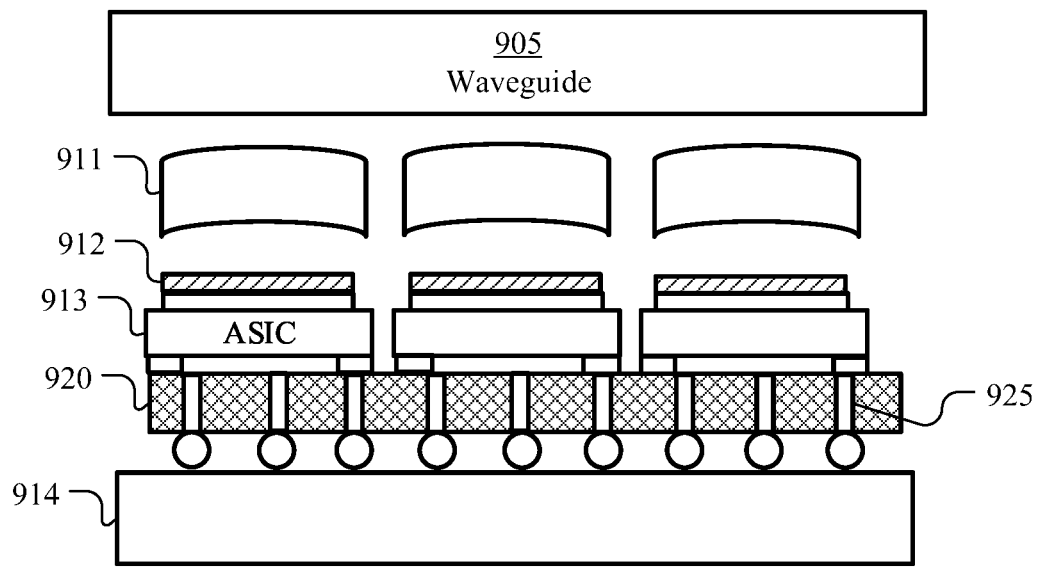

FIG. 9C illustrates a configuration in which an interposer 920 is used to attach the ASICs 913 to a PCB. The use of the interposer 920 may allow each ASIC 913 more direct communication with the other ASICs 913, increasing communication efficiency without dramatically increasing wiring complexity. In this configuration each μLED array 912 is bonded with an ASIC 913. The ASICs 913 are in turn bonded with a common interposer 920. The common interposer 920 may be composed of materials to allow the ASICs 913 to communicate directly without need for additional wiring. The interposer 920 may include one or more through-silicon vias 925, allowing the ASICs 913 to also connect direct to the circuit board 914 as needed. This configuration may provide more structural support for the ASICs 913 than other configurations, which allow for more movement of the circuit board. The configurations illustrated in FIGS. 9A-9C may be most naturally used with the architecture illustrated in FIG. 8C. In that configuration, a warp engine and DDI control is allocated to a monochrome μLED matrix in a single ASIC 850*a*, 850*b*, and 850*c*. The ASICs 913 in each of FIGS. 9A-9C, which are bonded to a single μLED matrix 912, may implement the contemplated projector ICs.

Figure 9D:
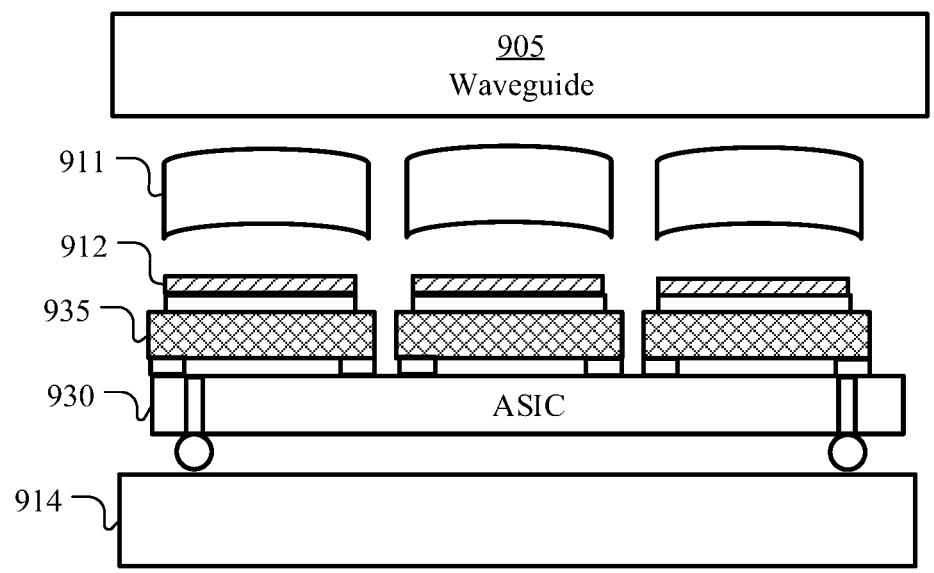

FIG. 9D illustrates a configuration in which a single ASIC 930 is connected to multiple μLED arrays 912. As before, the configuration includes coupling components 911 for each μLED array 912 that couples the particular μLED array 912 to the waveguide 905 of the HMD. However, instead of an ASIC allocated per μLED array 912 (as in, for example, the configuration illustrated in FIG. 9C), a single ASIC 930 is associated with multiple μLED arrays 912. In the example shown in FIG. 9D, one ASIC 930 is associated with three μLED arrays 912 (each of which may be a monochromatic μLED array). The ASIC 930 is coupled to each of the μLED arrays 912 through a silicon interposer 935, respectively. The configuration illustrated in FIG. 9D may be especially beneficial when used with the architecture illustrated in FIG. 8A. In that configuration, a single warp engine and DDI control ASIC 815 is used with multiple μLED control and matrix ICs 820*a*, 820*b*, and 820*c*. The configuration illustrated in FIG. 9D may implement the configuration in FIG. 8A with minimal power requirements for the warp engine, as much of the work performed for each color channel can be shared and reused. This also decreases memory access times and improves processing speed.

Figure 9E:
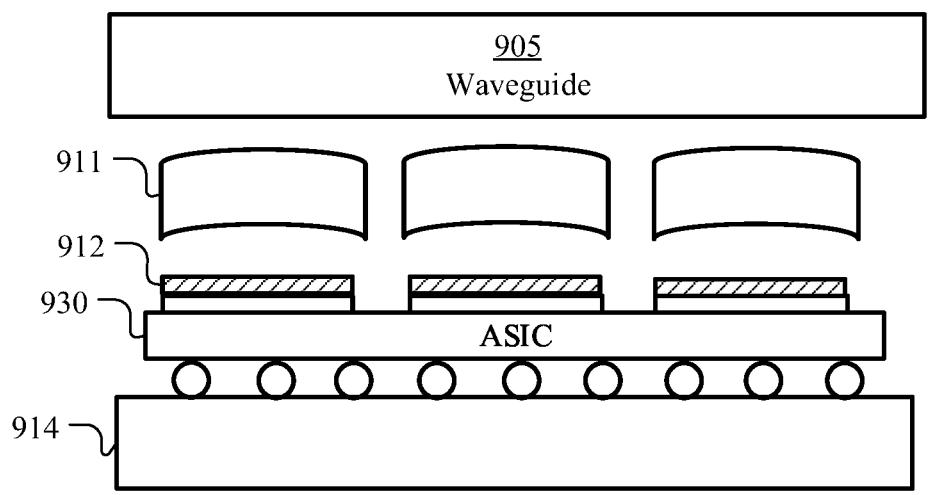

FIG. 9E illustrates a configuration in which a single ASIC 930 is bonded to multiple μLED arrays 912 without the user of a silicon interposer (as in FIG. 9D). The ASIC 930 is in turn bonded to a circuit board 914 for electrical and mechanical support. This configuration may simpler to manufacturer than some of the above described configurations. Thus, manufacturing costs and yields may be more easily controlled. In particular embodiments, a simpler configuration may allow for the use of more advanced manufacturing techniques, increasing the performance of the ASICs 930 and μLED arrays 912.

All of the configurations illustrated in and described with respect to FIGS. 9A-9E may benefit by use within certain of the architectural configurations illustrated in FIGS. 8A-8D. For example, in all configurations, the warp engine may be included with a central headset CPU. This may allow for maximal memory sharing when the warp engine is performing many of its stated operations. For example, there may be overlap the texture mapping and blending effects that can be shared for many projectors. Note that where a single ASIC or layer of ASIC is shown in FIGS. 9A-9E, a stack of ASICs (as in a 3D implementation) may also be used with the appropriate modifications. Furthermore, additional components, such as additional ASICs, ICs, μLED arrays, or interposers may be added to any given layer to further expand the capabilities of the illustrated configurations. For example, in the configuration illustrated in FIG. 9D, one or more additional components may be added on the top of the silicon interposer 935. This may allow, for example, an additional ASIC to be added to the configuration to communicate with the μLED array 912. As with the architectures shown in FIGS. 8A-8D, a variety of considerations may affect the choice of one configuration over another. Such considerations may include packaging size, cost of manufacture and assembly, heat distribution and dissipation, power use, resiliency, any other suitable considerations, or any combination thereof.

Example Method for Generating and Displaying Modified Sub-Frames

Figure 10:
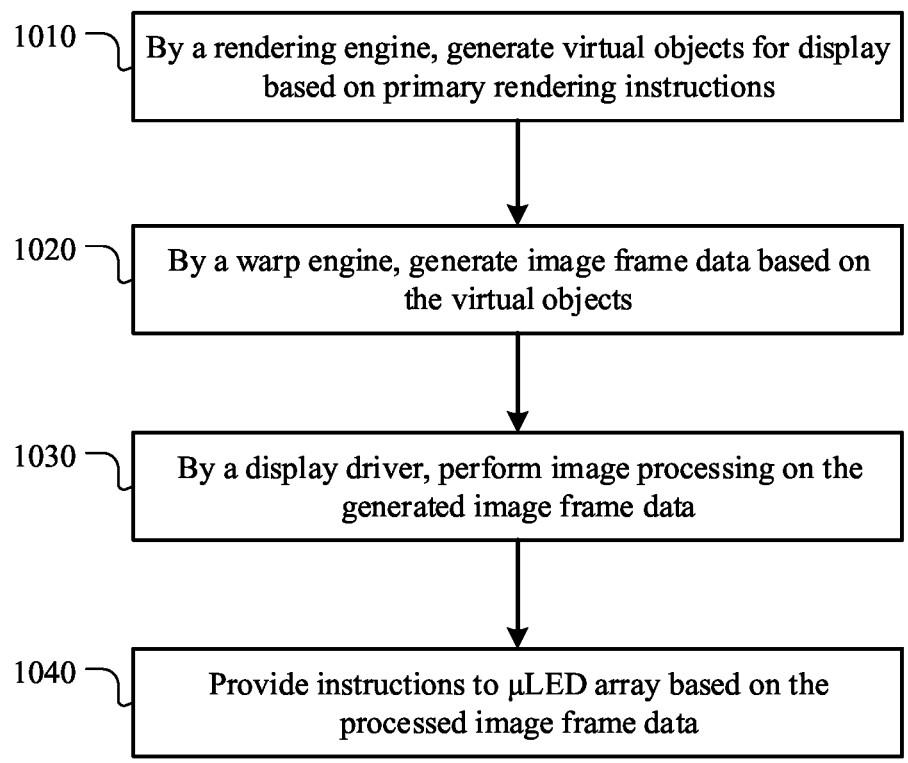
FIG. 10 illustrates an example method for generating and displaying modified sub-frames.

FIG. 10 illustrates an example method 1000 for generating and displaying modified sub-frames. The method may begin at step 1010, where a rendering engine 300 may generate virtual objects for display based on primary rendering instructions. The primary rendering instructions may include a set of polygons and associated colors for display. The rendering engine may perform initial visibility determinations based on information regarding the location of a viewer with respect to a virtual scene. The rendering engine may produce specialized object primitives, such as the above described surfaces, for use by a warp engine 410 which may be incorporated in a projector 400. The surfaces may comprise 2D images representing a 3D virtual scene. The rendering engine may provide the surfaces to a warp engine 410 at a rate of, e.g., 30-90 Hz. At step 1020, a warp engine 410 may generate image frame data for the frame to be rendered based on virtual objects (e.g., surfaces) received from a rendering engine. The warp engine 410 may perform visibility determinations for the surfaces based on the location of a user's view into the virtual scene, calculate and apply one or more geometric warps, perform color interpolation and brightness corrections, and otherwise prepare the image frame data to be displayed. The warp engine 410 may provide image frame data to a display driver 420 at a rate of e.g., 120 Hz-10 kHz.

At step 1030, a display driver 420, which may be incorporated in a projector 405, may perform image processing on the received image frame data. For example, an image processing block 430 of a display 420 driver may calculate and apply one or more dithering operations, including one- or two-dimensional spatial dithering or temporal-spatial dithering. The image processing block 430 may calculate a color depth precision error for one or more μLEDs of a μLED array. The image processing block 430 may propagate the color depth precision error to one or more neighboring μLEDs and/or to one or more future sub-frames of the frame. As another example, an image processing block 430 of the display driver 420 may calculate and apply one or more non-uniformity corrections for the frame data based on known non-uniformities in a μLED array. The display driver 420 may provide the processed image frame data to a backplane controller for display.

At step 1040, a backplane controller 450 may generate a provide instructions to a μLED array to cause the μLED array to display the image frame data. In particular embodiments, a PWM controller 455 may generate timing instructions to cause the μLEDs of the μLED array to illuminate at a rate of 120 Hz-10 kHz.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for up-sampling display frames including the particular steps of the method of FIG. 10, this disclosure contemplates any suitable method for up-sampling display frames including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Example Computer System

Figure 11:
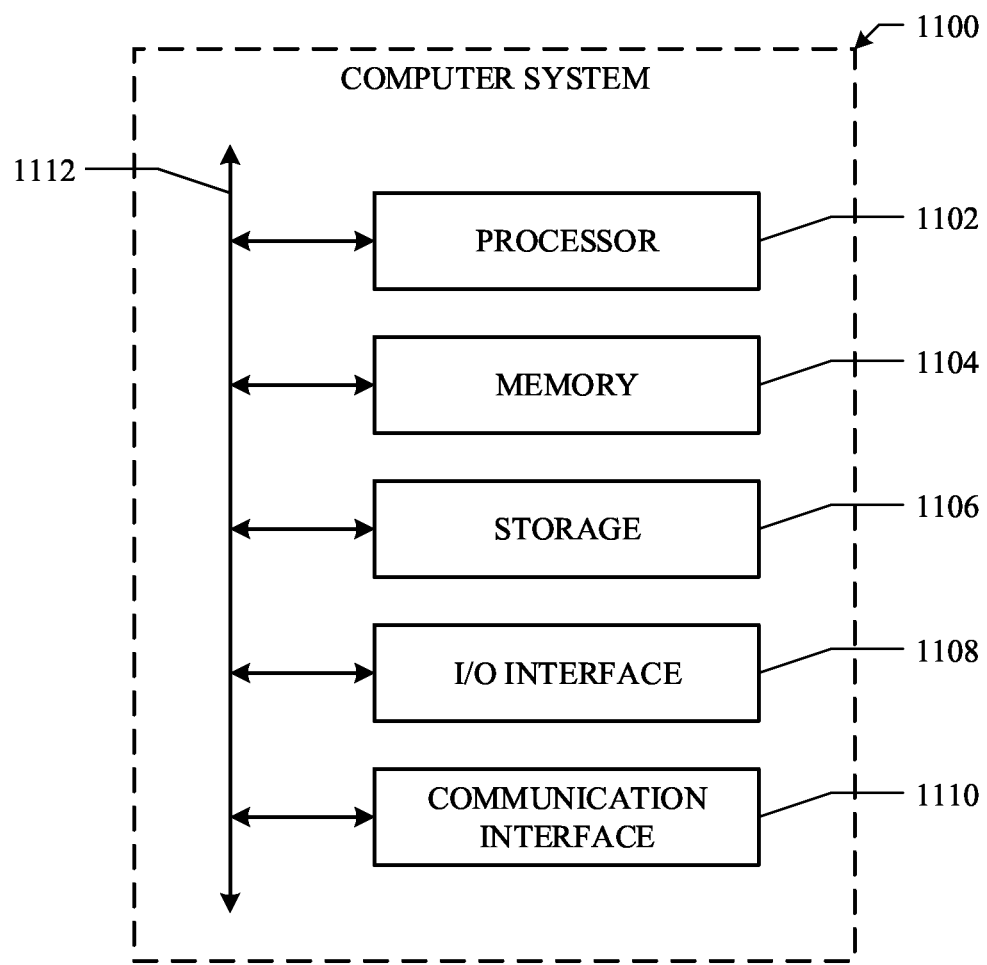
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a main-frame, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Although particular embodiments herein may be described as using application-specific integrated circuits, it should be understood that this is merely for example purposes. Standard components or other integrated circuits capable of the described functions, or of being programmed to complete the function attributed to each ASIC may be substituted.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A headset display device comprising a central processor and a plurality of projector integrated circuits for eyes of a wearer of the headset display device, wherein each eye of the wearer is associated with at least three projector integrated circuits, and wherein each of the three projector integrated circuits is communicatively coupled to the central processor and comprises:

a first integrated circuit comprising a light emitter array having monochrome light emitters of a single color, where the light emitter array is supported by a designated backplane control integrated circuit associated with the monochrome light emitters within the first integrated circuit; and a second integrated circuit coupled to the first integrated circuit, wherein the second integrated circuit comprises a graphics processor configured to receive image data and generate transformed image data based on the received image data, wherein the graphics processor is configured to provide the transformed image data to the first integrated circuit, wherein the first integrated circuit is configured to output the transformed image data using the light emitter array, wherein the first integrated circuit and the second integrated circuit are within a single chip, and wherein the first integrated circuit is configured to communicate with the second integrated circuit using through-silicon vias, wherein the designated backplane control integrated circuits of the three projector integrated circuits are different, and the monochrome light emitters of the three projector integrated circuits emit different colors.

2. The headset display device of claim 1, wherein the transformed image data is for correcting for one or more distortions comprising a geometrical distortion or a brightness distortion.

3. The headset display device of claim 2, wherein the one or more distortions stem from a near eye display optical system comprising a display or a waveguide of the headset display device.

4. The headset display device of claim 1, wherein the second integrated circuit further comprises a display driver integrated circuit configured to adjust display timing of one or more pixel colors of one or more displayed subframes, and wherein the one or more displayed subframes have finer gradations than a physical limitation of the light emitter arrays.

5. The headset display device of claim 1, wherein the first integrated circuit is mounted on a surface of the second integrated circuit, and wherein the first integrated circuit and the second integrated circuit form a vertical three-dimensional stacking structure.

6. The headset display device of claim 1, wherein the first integrated circuit is mounted next to the second integrated circuit on an interposer, and wherein the first integrated circuit and the second integrated circuit form a 2.5-dimensional structure.

7. The headset display device of claim 1, wherein:
the central processor is configured to receive, from a first rendering device, data for images to be displayed by the headset display device;
the headset display device is configured to process the received data using the plurality of projector integrated circuits; and
the plurality of projector integrated circuits are configured to produce, using the light emitter array of each projector integrated circuit, light based on the processed data.

8. The headset display device of claim 7, wherein the headset display device further comprises a waveguide configuration, and wherein the light produced by the light emitter array of each projector integrated circuit is directed through the waveguide configuration to at least one eye of the wearer of the headset display device.

9. The headset display device of claim 8, wherein the data for images to be displayed by the headset display device is received from the first rendering device at a first rate and the received data is processed using the plurality of projector integrated circuits at a second rate, the second rate being greater than the first rate.

10. The headset display device of claim 7, wherein the first rendering device is in wireless communication with the headset display device.

11. The headset display device of claim 1, wherein the graphics processor is further configured to generate transformed image data based on a current viewpoint of the wearer.

12. The headset display device of claim 11, wherein the headset display device further comprises a movement sensor or orientation sensor, and wherein the current viewpoint of the wearer is determined based on sensor data received from the movement sensor or orientation sensor.

13. The headset display device of claim 1, wherein the graphics processor is further configured to apply geometric transformations to the received image data to correct chromatic aberrations.

14. The headset display device of claim 1, wherein the graphics processor comprises:
a transform block configured to determine, based on a current viewpoint of the wearer, visibility information for virtual objects to be displayed in an artificial reality scene;
a pixel block configured to determine color values based on the determined visibility information; or
a display block configured to prepare the determined color values for output to a display driver.

15. The headset display device of claim 1, wherein each light emitter array comprises μLEDs emitting light of a pre-determined color.

16. The headset display device of claim 1, wherein the received image data has a first frame rate, and wherein the transformed image data has a second frame rate higher than the first frame rate.

17. The headset display device of claim 16, wherein the transformed image data having the second frame rate is configured to allow multiple displayed subframes to be integrated over time by eyes of the wearer.

18. The headset display device of claim 1, wherein the second integrated circuit comprises a display driver integrated circuit configured to adjust display positions of one or more pixel colors of one or more displayed subframes, and wherein the one or more displayed subframes have finer gradations than a physical limitation of the light emitter arrays.

19. A method, by a headset display device, comprising:
receiving, from a first rendering device, data for images to be displayed by the headset display device, wherein the headset display device comprises:
a central processor and a plurality of projector integrated circuits for eyes of a wearer of the headset display device, wherein each eye of the wear is associated with at least three projector integrated circuits, and wherein each of the three projector integrated circuits is communicatively coupled to the central processor and comprises:
a first integrated circuit comprising a light emitter array having monochrome light emitters of a single color, where the light emitter array is supported by a designated backplane control integrated circuit associated with the monochrome light emitters within the first integrated circuit; and
a second integrated circuit coupled to the first integrated circuit, wherein the second integrated circuit comprises a graphics processor configured to receive image data and generate transformed image data based on the received data, wherein the graphics processor is configured to provide the transformed image data to the first integrated circuit, wherein the first integrated circuit is configured to output the transformed image data using the light emitter array, wherein the first integrated circuit and the second integrated circuit are within a single chip, and wherein the first integrated circuit is configured to communicate with the second integrated circuit using through-silicon vias, wherein the designated backplane control integrated circuits of the three projector integrated circuits are different, and the monochrome light emitters of the three projector integrated circuits emit different colors; and producing, using the light emitter array of each projector integrated circuit, light based on the received data.

20. One or more computer-readable non-transitory storage media embodying software that is operable when executed to:

receive, by a headset display device and from a first rendering device, data for images to be displayed by the headset display device, wherein the headset display device comprises:

a central processor and a plurality of projector integrated circuits for eyes of a wearer of the headset display device, wherein each eye of the wear is associated with at least three projector integrated circuits, and wherein each of the three projector integrated circuits is communicatively coupled to the central processor and comprises:

a first integrated circuit comprising a light emitter array having monochrome light emitters of a single color, where the light emitter array is supported by a designated backplane control integrated circuit associated with the monochrome light emitters within the first integrated circuit; and a second integrated circuit coupled to the first integrated circuit, wherein the second integrated circuit comprises a graphics processor configured to receive image data and generate transformed image data based on the received image data, wherein the graphics processor is configured to provide the transformed image data to the first integrated circuit, wherein the first integrated circuit is configured to output the transformed image data using the light emitter array, wherein the first integrated circuit and the second integrated circuit are within a single chip, and wherein the first integrated circuit is configured to communicate with the second integrated circuit using through-silicon vias, wherein the designated backplane control integrated circuits of the three projector integrated circuits are different, and the monochrome light emitters of the three projector integrated circuits emit different colors; and produce, using the light emitter array of each projector integrated circuit, light based on the received data.

* * * * *